United States Patent
Foreman et al.

(10) Patent No.: US 10,517,278 B1
(45) Date of Patent: Dec. 31, 2019

(54) PORTABLE BASKET COLONY FOR GROWING AND TRANSPORT AND METHOD OF USE

(71) Applicant: Tyson Foods, Inc., Springdale, AR (US)

(72) Inventors: Doug Foreman, Springdale, AR (US); Stephen Brannan, Wesley, AR (US); James A. Ruff, Farmington, AR (US); David Lee Mantooth, Fayetteville, AR (US); Kevin W. Guernsey, Destin, FL (US); Timothy J. DeRoche, Harahan, LA (US); Brian R. Lee, Kenner, LA (US)

(73) Assignee: TYSON FOODS, INC., Springdale, AR (US)

( * ) Notice: Subject to any disclaimer, the term of this patent is extended or adjusted under 35 U.S.C. 154(b) by 424 days.

(21) Appl. No.: 15/644,523

(22) Filed: Jul. 7, 2017

Related U.S. Application Data

(60) Division of application No. 14/243,443, filed on Apr. 2, 2014, now Pat. No. 9,737,056, which is a
(Continued)

(51) Int. Cl.
*B65D 1/40* (2006.01)
*A01K 45/00* (2006.01)
(Continued)

(52) U.S. Cl.
CPC .......... *A01K 45/005* (2013.01); *A01K 31/005* (2013.01); *A01K 31/007* (2013.01); *A01K 31/18* (2013.01)

(58) Field of Classification Search
CPC ................ A01K 31/005; A01K 45/005; A01G 2009/003; A01G 9/028; A01G 1/005;
(Continued)

(56) References Cited

U.S. PATENT DOCUMENTS

| 932,086 A | 8/1909 | Allen |
| 2,065,416 A | 12/1936 | Albert |

(Continued)

FOREIGN PATENT DOCUMENTS

| EP | 0220782 A1 | 5/1987 |
| GB | 2108083 A | 5/1983 |

(Continued)

OTHER PUBLICATIONS

United States Department of Agriculture (USDA), Animal and Plant Health Inspection Service. 'Backyard Biosecurity: 6 Ways to Prevent Poultry Diseases' [online], Jun. 2008 [retrieved on Mar. 7, 2014]. Retrieved from the Internet: <URL: http://www.aphis.usda.gov/publications/animal_health/contenUprintable_version/6-StepPoster-English_Arabic.pdf>.

*Primary Examiner* — Kristen C Hayes
(74) *Attorney, Agent, or Firm* — Greensfelder, Hemker & Gale, P.C.

(57) ABSTRACT

A colony basket and method of using the same for handling poultry from DOC through the growing process and on to a production facility comprising a harvesting system, a loading system, a transport system, an unloading and storing system, hanging system and cleaning system. The system and method performs the steps of harvesting and colonizing live poultry into a singly stackable and transportable colony basket, stacking and loading the trays on a transport, unloading and temporarily storing the poultry for subsequent processing. The system and method further includes the use of a modular colony basket for interchangeable use with the described system.

10 Claims, 42 Drawing Sheets

Related U.S. Application Data continuation-in-part of application No. 13/777,767, filed on Feb. 26, 2013, now Pat. No. 9,119,382.

(51) Int. Cl.
*A01K 31/00* (2006.01)
*A01K 31/18* (2006.01)

(58) Field of Classification Search
CPC ... B65D 1/40; B65D 7/12; B65D 7/14; B65D 7/24; B65D 7/30; B65D 2519/00577; B65D 2519/00587; B65D 2519/00875; B65D 11/14; B65D 11/18; B65D 11/20; B65D 19/20; B65D 19/12; B65D 19/16; B65D 21/00; B65D 21/02; B65D 21/0238
USPC .......................................................... 220/621
See application file for complete search history.

(56) References Cited

U.S. PATENT DOCUMENTS

| | | | |
|---|---|---|---|
| 2,167,956 A | 8/1939 | Morrill | |
| 2,562,691 A | 7/1951 | Beringer | |
| 2,715,492 A | 8/1955 | Zebarth | |
| 3,108,569 A | 10/1963 | Kundikoff | |
| 3,368,579 A | 2/1968 | Godshalk | |
| 3,416,464 A | 12/1968 | Gutridge | |
| 3,446,415 A | 5/1969 | Bromley | |
| 3,507,441 A | 4/1970 | Wilcox et al. | |
| 3,520,281 A | 7/1970 | Hart | |
| 3,528,583 A | 9/1970 | Taylor | |
| 3,727,582 A | 4/1973 | Heying et al. | |
| 3,777,710 A | 12/1973 | Rhinehart | |
| 3,870,185 A | 3/1975 | Sanders et al. | |
| 3,930,467 A | 1/1976 | Fier | |
| 4,036,177 A | 7/1977 | DeSmit | |
| 4,365,591 A | 12/1982 | Wills et al. | |
| 4,456,142 A * | 6/1984 | Burling | B65D 11/20 220/4.28 |
| 4,527,513 A | 7/1985 | Hart et al. | |
| 4,662,532 A | 5/1987 | Anderson et al. | |
| 4,820,383 A * | 4/1989 | Shchamorov | B65D 11/1846 220/6 |
| 4,928,633 A | 5/1990 | Jennings | |
| 4,998,967 A | 3/1991 | Box | |
| 5,515,987 A | 5/1996 | Jacques et al. | |
| 5,624,037 A | 4/1997 | Kozo | |
| 5,761,854 A | 6/1998 | Johnson et al. | |
| 5,902,089 A | 5/1999 | Sinn et al. | |
| 5,943,981 A | 8/1999 | Chrisco | |
| 6,062,469 A | 5/2000 | Hafer et al. | |
| 6,189,695 B1 | 2/2001 | Ching-rong | |
| 6,338,316 B1 | 1/2002 | Weaver | |
| 6,447,234 B2 | 9/2002 | Sinn et al. | |
| 6,601,724 B1 | 8/2003 | Koefelda et al. | |
| 6,694,918 B2 * | 2/2004 | Draft | A01K 31/002 119/400 |
| 6,766,768 B1 | 7/2004 | Ver Hage | |
| 6,820,761 B1 | 11/2004 | Mouri et al. | |
| 6,851,389 B2 | 2/2005 | Giordano et al. | |
| 6,880,488 B1 | 4/2005 | Hall | |
| 6,918,502 B1 | 7/2005 | Overholt et al. | |
| 7,152,751 B2 | 12/2006 | Bartasevich, Jr. et al. | |
| 7,281,637 B2 | 10/2007 | Hadar | |
| 7,661,392 B2 | 2/2010 | Conger et al. | |
| 7,757,876 B1 * | 7/2010 | Ditter | A01J 25/15 220/4.28 |
| 7,861,673 B2 | 1/2011 | Huisinga et al. | |
| 7,861,879 B2 | 1/2011 | Samprathi | |
| 7,909,000 B1 | 3/2011 | O'Neill et al. | |
| 8,622,006 B2 | 1/2014 | Dubois | |
| 8,622,266 B2 | 1/2014 | McMillan | |
| 8,863,674 B2 * | 10/2014 | Smolenaers | B65D 19/0016 108/51.11 |
| 9,079,684 B2 * | 7/2015 | Ditter | A01J 25/15 |
| 9,119,382 B2 | 9/2015 | Foreman et al. | |
| 9,199,764 B2 * | 12/2015 | Smolenaers | B65D 19/0016 |
| 9,221,580 B2 * | 12/2015 | Zelek | B65D 19/0018 |
| 9,228,361 B2 * | 1/2016 | Brisendine | E04F 15/02405 |
| 10,232,978 B2 * | 3/2019 | Chinni Vergottini | B29C 45/0017 |
| 2002/0139798 A1 | 10/2002 | Logan et al. | |
| 2003/0056731 A1 | 3/2003 | Darby | |
| 2005/0103278 A1 | 5/2005 | Espinda | |
| 2009/0007853 A1 | 1/2009 | Johnson et al. | |
| 2012/0255498 A1 | 10/2012 | Pitzer | |
| 2012/0318811 A1 * | 12/2012 | Leasure | B65D 7/12 220/682 |
| 2012/0325162 A1 | 12/2012 | Wideman, Jr. | |
| 2014/0060585 A1 | 3/2014 | Van Den Nieuwelaar et al. | |
| 2014/0190372 A1 | 7/2014 | Smolenaers | |
| 2014/0209499 A1 | 7/2014 | Hobson | |
| 2014/0299067 A1 | 10/2014 | Foreman et al. | |
| 2014/0360120 A1 | 12/2014 | Brisendine et al. | |
| 2015/0068436 A1 | 3/2015 | Zelek et al. | |
| 2015/0197365 A1 | 7/2015 | Josefson | |
| 2016/0090209 A1 | 3/2016 | Brisendine et al. | |
| 2016/0235041 A1 | 8/2016 | Walther | |
| 2018/0346191 A1 * | 12/2018 | Chinni Vergottini | B65D 21/0212 |

FOREIGN PATENT DOCUMENTS

| | | |
|---|---|---|
| GB | 2219480 A | 12/1989 |
| GB | 2480500 A | 11/2011 |
| GB | 2507348 A | 4/2014 |
| JP | 2001-95386 A | 4/2001 |

* cited by examiner

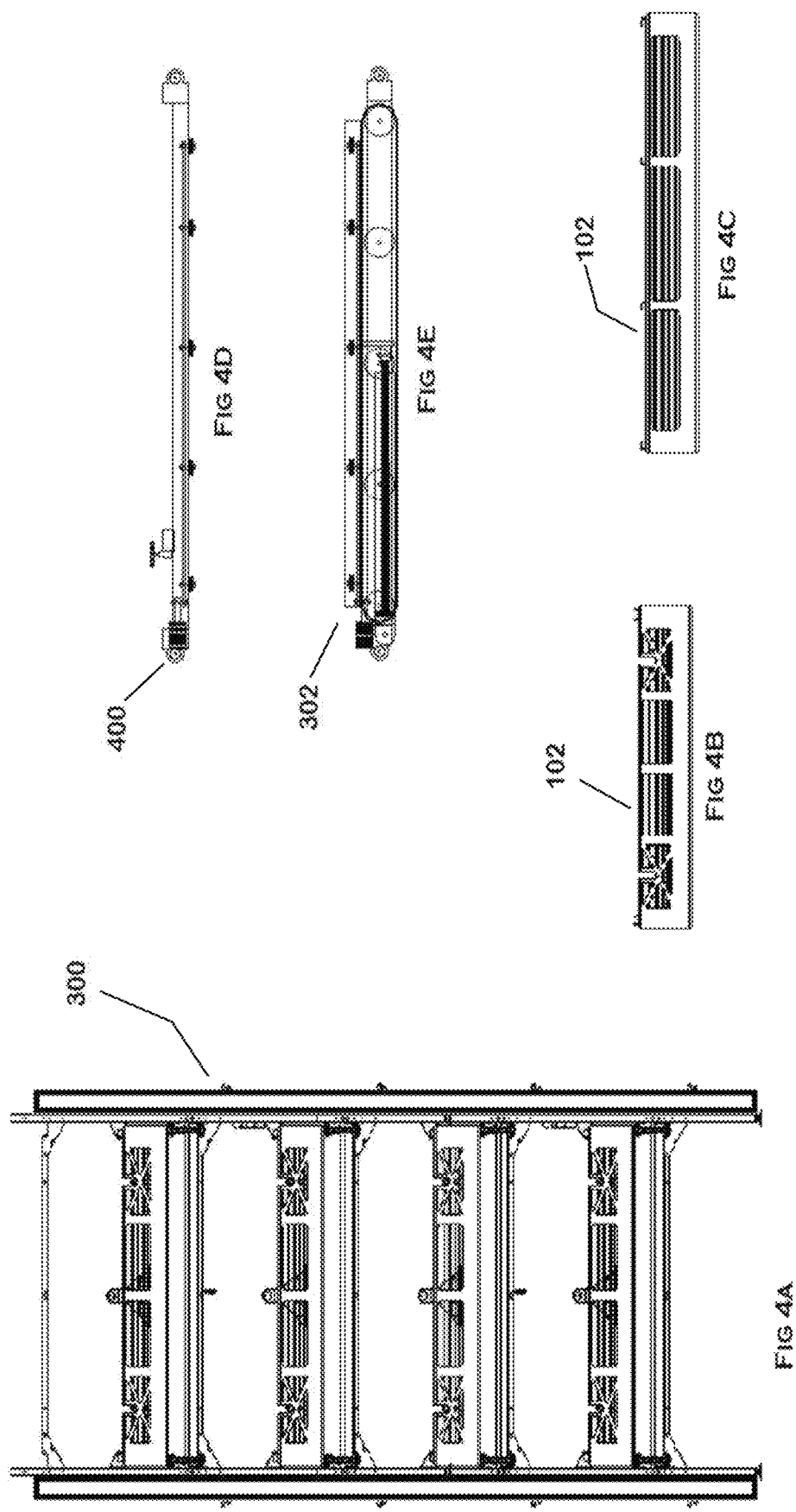

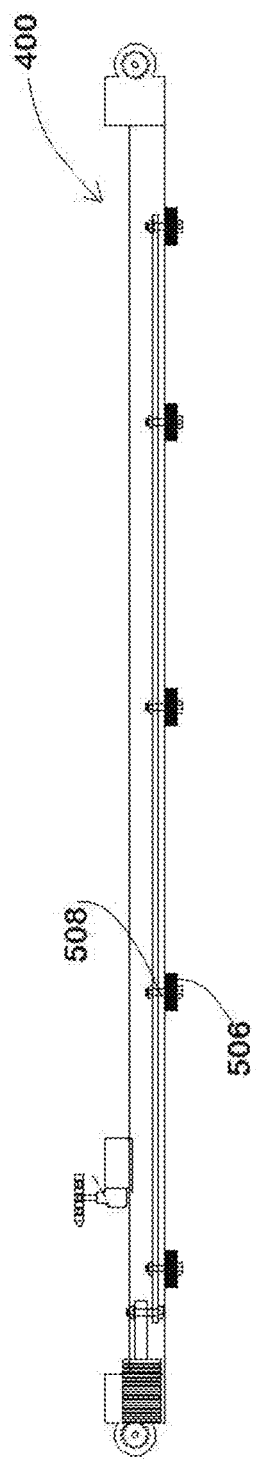
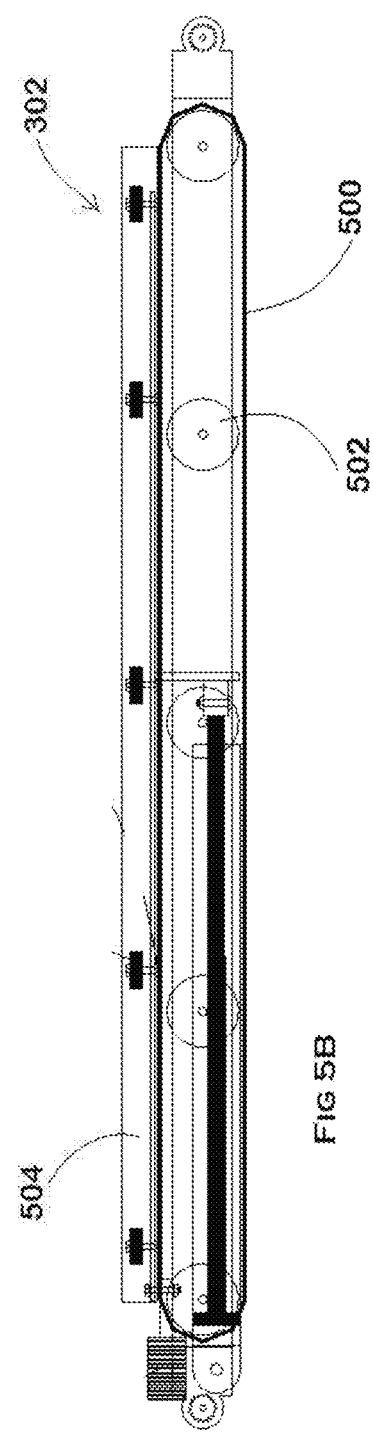
Fig 5A
Fig 5B

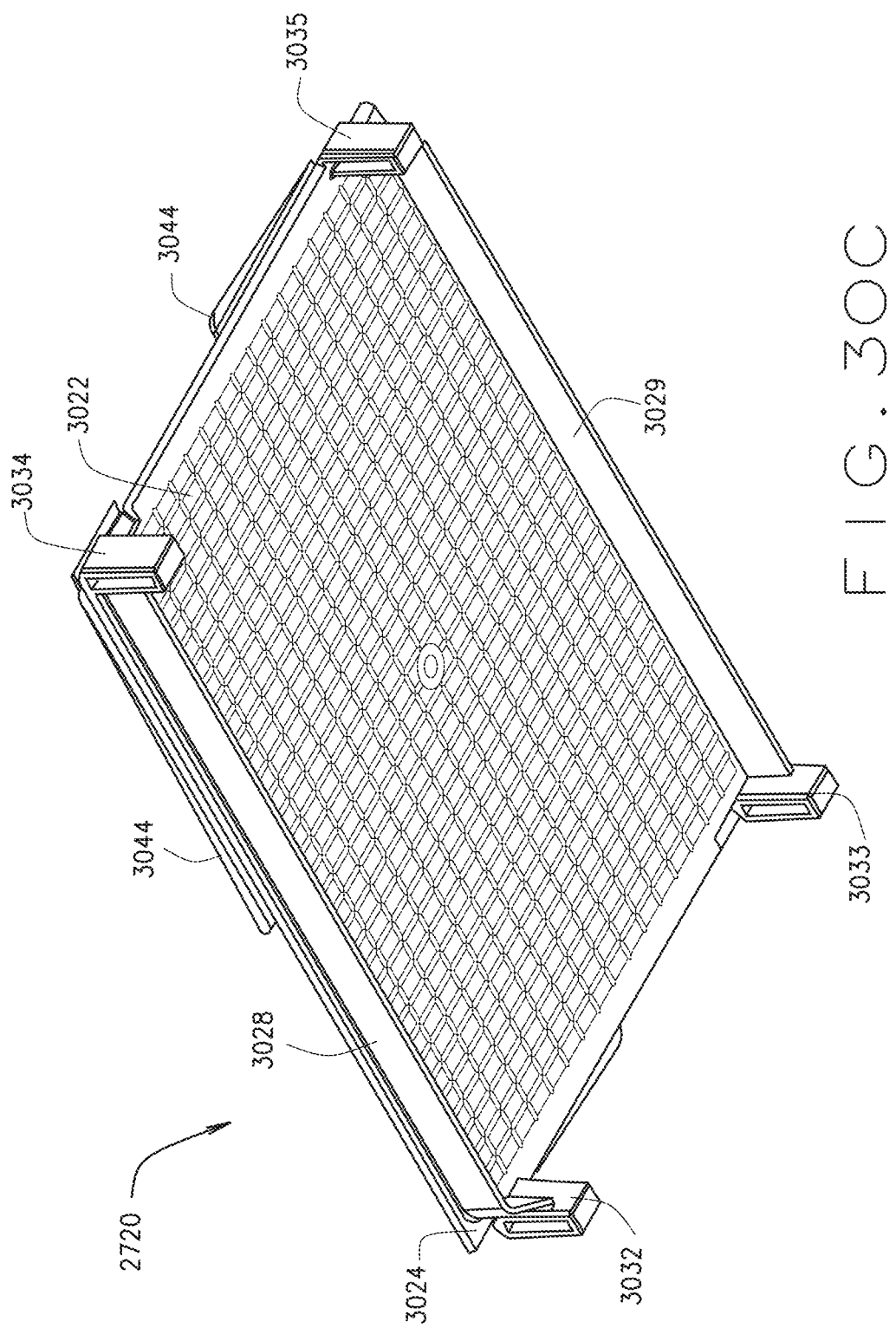

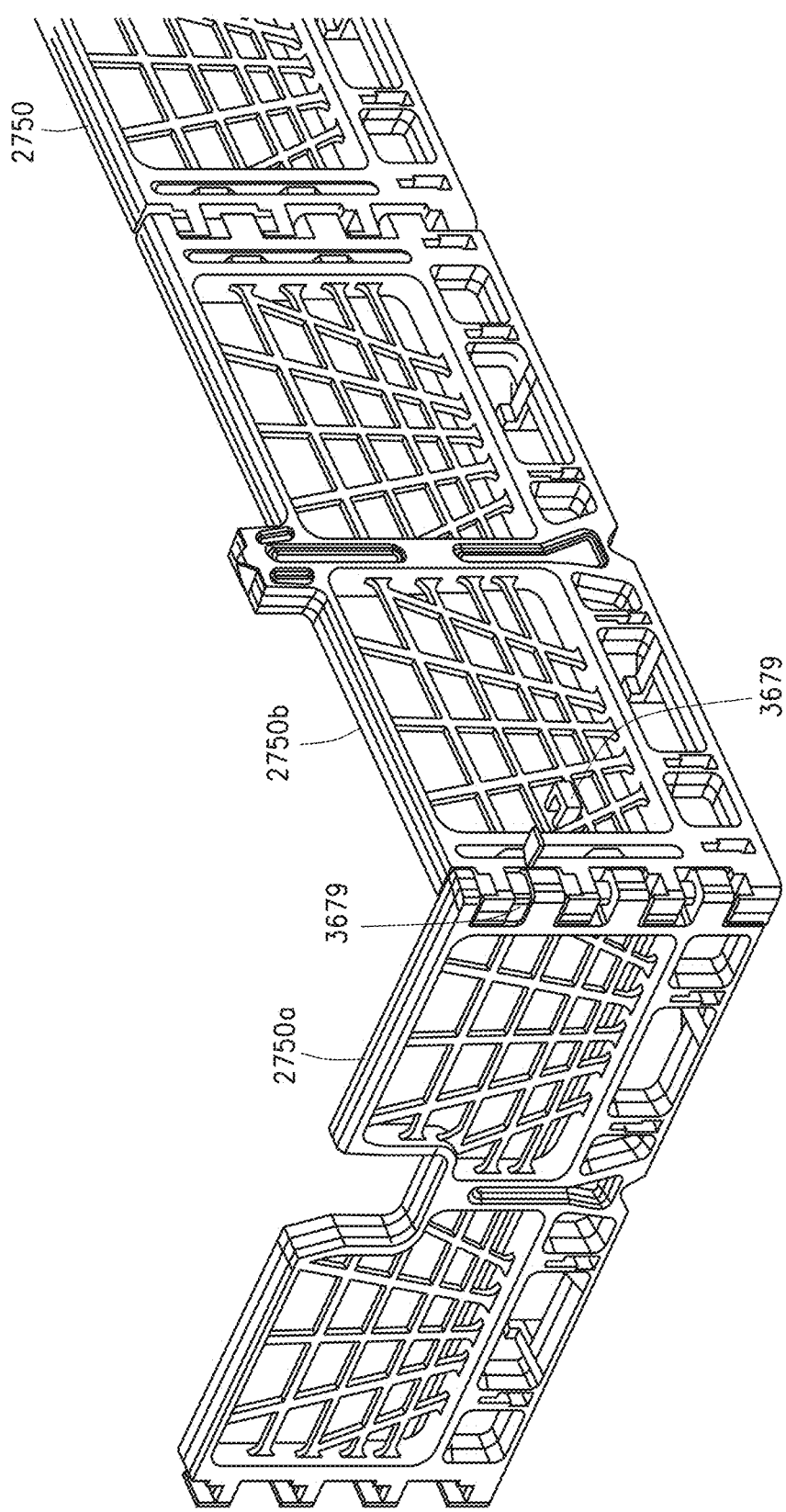

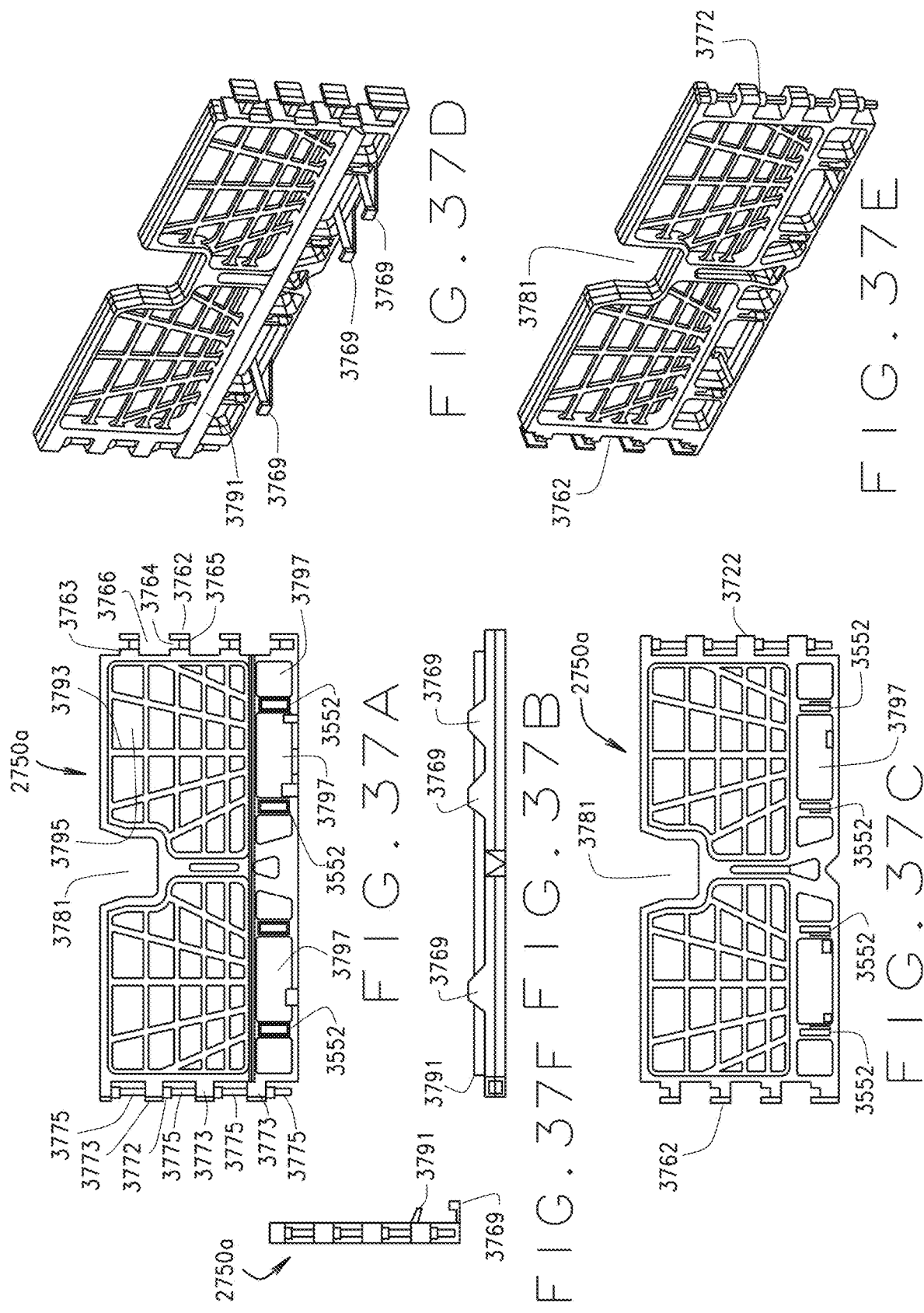

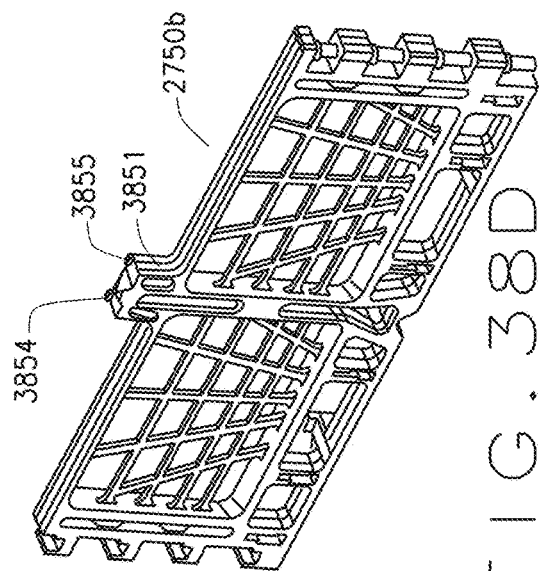
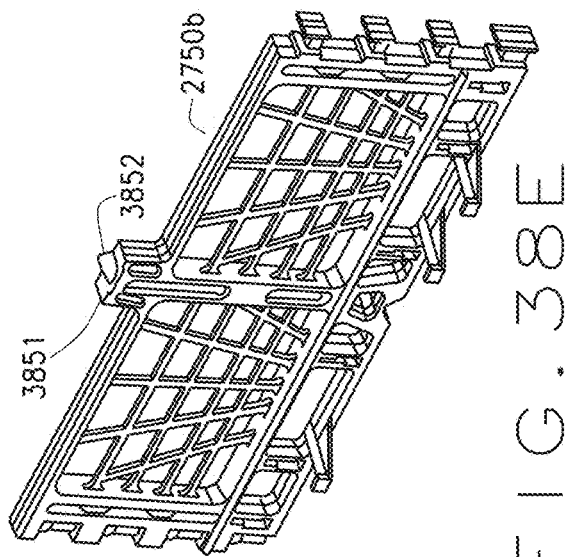
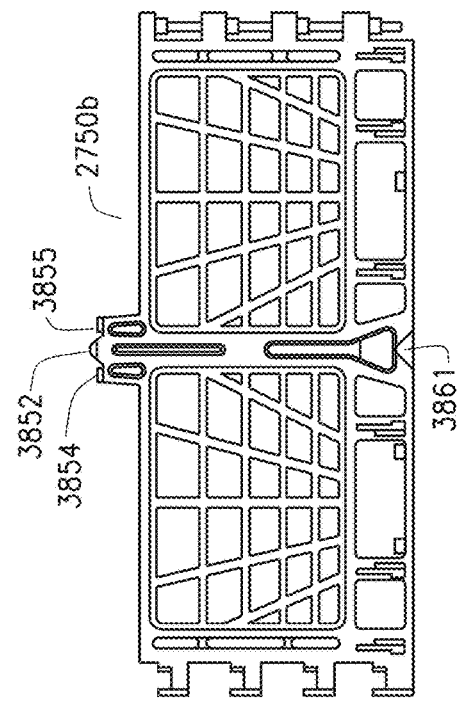
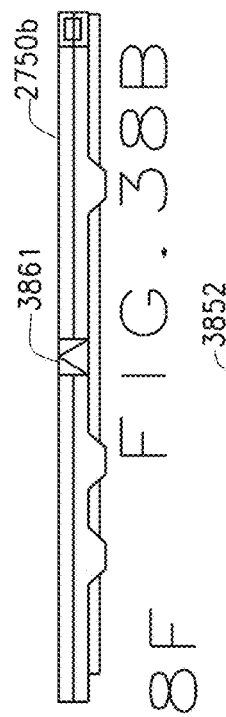
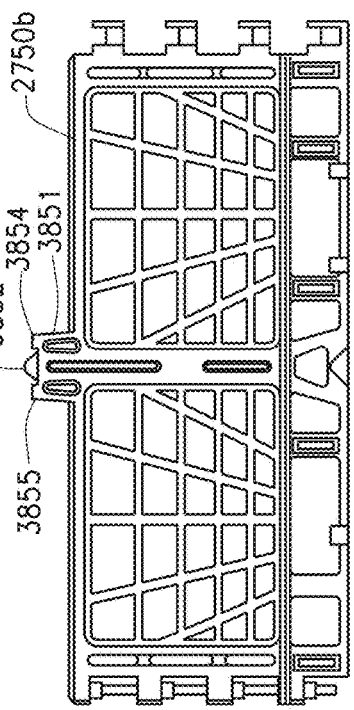
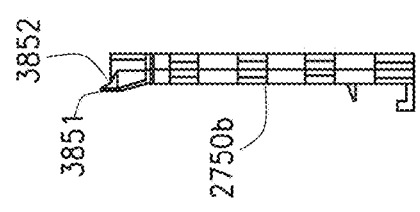

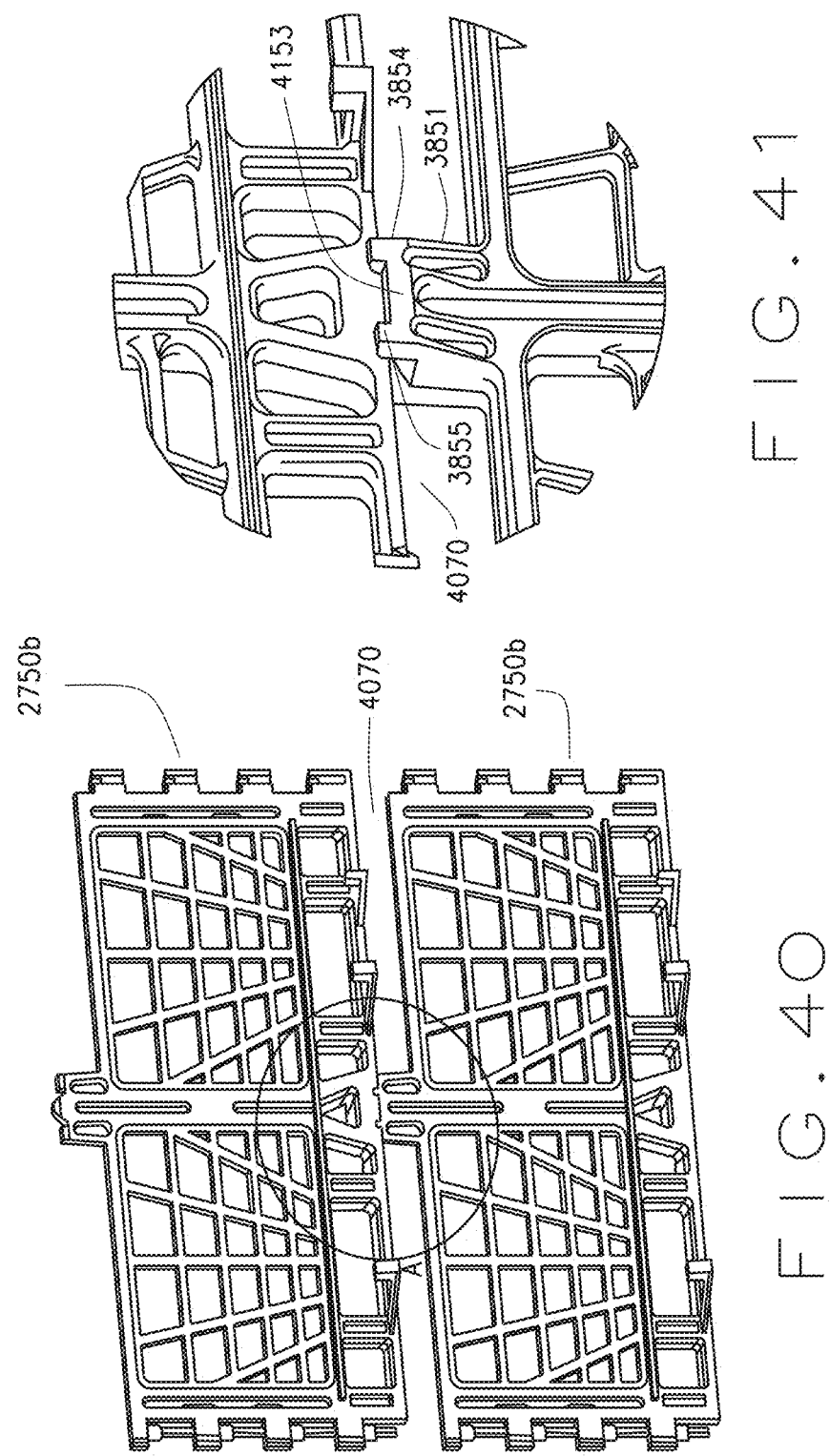

PORTABLE BASKET COLONY FOR GROWING AND TRANSPORT AND METHOD OF USE

CROSS-REFERENCE TO RELATED APPLICATIONS

This application is a divisional application of Ser. No. 14/243,443 filed Apr. 2, 2014; said application Ser. No. 14/243,443 is a continuation-in-part of U.S. patent application Ser. No. 13/777,767 filed Feb. 26, 2013 and issued as U.S. Pat. No. 9,119,382 entitled Portable Basket Colony for Growing and Transport and Method of Use; the entire disclosures of which are incorporated herein by reference.

BACKGROUND OF INVENTION

Field

The field relates generally to poultry processing and more particularly to handling, growing and transporting live poultry.

Background Art

Loading and unloading birds and transportation of live birds from the hatchery stage through the kill stage at a production facility is a challenging task. The birds have to be gathered, contained and transferred to a transport means and subsequently unloaded with minimal damage or harm to the animal, which is challenging because birds instinctively resist such movement. For example, transport of live poultry from the hatchery to growing houses and from growing houses to processing facilities is required. One method of transport of live poultry is containing the birds in cages and stacking the cages on a truck with a flatbed trailer for transport. Loading and unloading trailers with live animals, particularly from a location where the animals are grown or raised to a processing facility, can in the case of chickens, increase the stress level of the animal. With heightened stress, animals are more likely to have increased body temperature, experience bruising, dislocated wing/leg joints and potential tissue damage along with an increased pH level, which may affect the quality of the muscle. Once the birds are captured in cages, the cages must be loaded on the trailer.

Existing systems involve crews of catchers to unload the birds from the growing colonies and load them for transport means. Loading of the cages on the trailer consumes the full time of one operator to move cages from the house or growing area to the trailer and it requires skill to stack cages on the trailer so that they can be properly secured for transport. The cages often become damaged in this operation over time and need to be repaired and eventually replaced. Damage to the cages often involves the doors through which the birds are inserted. Poorly operating doors leads to increased time to load cages and potential bird damage.

There are significant labor issues because it is very labor intensive and requires some level of skill and training. There are health issues for both the birds and the handlers. The labor intensive handling of the birds promotes infections of the handler and risks harm to the birds. This results in numerous health and safety concerns. The cages are prone for damage which can cause bird damage and extensive time and labor is utilized to fill the cages with birds and load and secure them for transport. The cages or other transport containers also have to be cleaned prior reuse, which can also be a labor intensive and costly effort.

Loading of poultry is a cumbersome and time consuming task. In the catching process, the poultry are placed into cages. Some cage designs consist of "drawers" and can vary from 10 to 15 drawers averaging a 20-25 bird capacity per drawer. Birds can be placed into the cages either manually or by semi-automatic means. A forklift then can load a flatbed truck with 18-22 cages that are stacked in pairs. Once the cages are in place, each stack has to be secured by chains to the frame of the trailer.

Semi-automated methods of harvesting the birds in the houses have encountered mechanical and functional problems. In one sense this semi-automated method eliminates the need for operators to physically pick up the birds. However, operators are still needed to operate the equipment and to move the birds forward and away from the sides of the house. Therefore, some handling is still necessary.

Plastic poultry trays or drawers are sometimes used to transport and house birds temporarily, however, these systems are temporal and only used during certain stages and are not integral with growing systems or transport systems. Use of such trays or drawers still require significant handling of birds, though they may be somewhat more durable than metal cages. Further, these plastic poultry trays, though less often than the standard cages, are also subject to damage or breakage resulting in a need to replace the entire tray, even though only one area of the tray may be cracked or otherwise damaged. The plastic trays are likely easier to clean and sanitize than the standard cage but given the size of the typical plastic tray and the webbing of the mesh, they also can be difficult to clean. Also, storing trays when they are not in use can consume a large amount of space.

As noted above, problems occur with, loading, unloading, harvesting, placing birds into cages (plastic drawers or trays), loading the cages on a transport, and transporting to the processing facilities. Also, current processes are labor intensive and costly. The problems occur as the DOC (Day Old Chicks) are transitioned from the hatcheries to the growing centers and then to the production facilities. A new system and method for harvesting, loading, growing, transporting, and unloading is needed that addresses the above problems by reducing physical handling of the birds from the hatchery stage through the kill and production stage. In the new system and method, the device by which the birds should be transported should be reusable, interchangeable, and easily cleaned.

BRIEF SUMMARY OF INVENTION

The technology involves a system and method for handling poultry comprising a colony basket apparatus utilized throughout the process of transitioning the DOC from the hatchery, to the growing facility, through the growing process, and on to the production facility. The colony basket apparatus is utilized for harvesting, loading and unloading, growing, transport, storing and holding through the shackling process prior to the kill process. The method utilizes the colony basket apparatus to perform the steps of retrieving and loading a grouping of the DOC into the colony basket at the hatchery, transporting the same grouping of birds in the same colony basket to the growing facility, loading the colony basket containing the original grouping of birds into the colony system of the growing facility, growing the DOC to Broilers (chickens bred and raised specifically for meat production) in the original colony basket in which they were installed, removing and harvesting live poultry from the colony system while maintaining the same grouping of birds in the same colony basket in which they were originally placed, stacking and loading the colony basket of Broilers on a transport, transporting to a poultry production facility, unloading the colony basket and temporarily storing the poultry in the same colony basket for subsequent killing. The invention more particularly relates to a new portable colony basket for holding and making possible all necessary functions for the poultry animals from the DOC stage, through growing, through transport and up to production while maintaining a grouping of birds or subset thereof in the same colony basket throughout the process all of the way through the shackling process.

The concept of harvesting poultry utilizing one type of colony basket uniformly throughout the entire process from capturing the DOC at the hatchery to growing houses equipped with colony systems and on to production will make the process more efficient and will result in less worker and animal stress by resolving many of the problems related to the current methods of manually catching birds and placing in cages or other containers or using semi-automated systems to harvest and transition poultry. With the present invention, stackable tray colony baskets can be utilized that can be placed into and retrieved from colony systems in growing houses using automated systems and can be transferred and retrieved from transports when transitioning between locations within the overall process and the colony baskets can be further integrated with feeding and watering systems. The trays can be made from molded plastic or other material including metal aluminum metal and can have an open grid flexible flooring elevated above a lower manure trap flooring to keep the birds out of their manure and the sides can be vented. The bottoms can have an open grid pattern bottom to allow the birds to grasp with their paws to stabilize and reduce wing flapping, but the floor can also be flexible to reduce injury to the bird. The grid pattern also allows debris and feces to fall out to reduce cleaning and increased airflow to ventilate the birds. The top and bottom perimeter edges of the cages can be complimentary in shape for ease of stacking and stability reducing lateral movement of the stacked trays with respect to each other. The sides of the trays can also have vented openings. Once an upper tray is stacked on top of a lower tray, birds placed in the lower tray are contained. The upper most tray in a stack of trays can be capped by an additional empty tray or other cover or ceiling in the colony system or in the transport or other automated transitioning means.

An empty stack of colony baskets can be transported to a hatchery and loaded with DOC. The stack of colony baskets containing DOC can be loaded on a transport rack, which receives the colony baskets and transported to a growing house from the hatchery. The colony baskets can be unloaded from the transport rack to be transferred into a poultry house colony system manually or the transfer can by automated by a powered mover or conveyor and/or loading system. This method provides that no container stacks have to be manually or mechanically un-stacked for loading poultry because the DOC are already in the colony baskets. Previous systems required that trays be removed from a stack and then the poultry would be loaded into the trays and the trays are re-stacked, a powered mover can transport the trays to the outside to be loaded onto the trailer. The process of loading and unloading birds in the growing house has been eliminated.

The construction of the trailer can be a flatbed trailer with vertical framework to make up the structural integrity as well as to hold the stacks of individual colony baskets. There can be a plurality of vertical and horizontal rails to insure the structure and flexibility of the size and number of colony baskets the transport is capable of handling.

With the design of the present invention, there can be a frame work constructed on the transport trailer holding a lightweight material that can be pulled alongside the trailer to cover the sides. This shroud can create an envelope in which the environment can be better controlled and provide a more suitable environment for the animals.

Once the trailer arrives at the plant, the colony baskets can be unloaded and automatically moved into a warehouse or holding facility. This process can be performed as trucks arrive in order to build an entire storage of birds for a production shift. The trucks can be automatically unloaded in a very short period of time, thus eliminating the need for a forklift. The system can work in a "last-in first-out" method. The process can be improved through the efficiency of bringing the birds in the same colony basket that originated at the hatchery and the same colony basket continuing through the growing process and on to the production plant kill area and not consuming time loading and unloading birds into and out of cages or other containers.

The automated unloading can be done automatically to pull the trays off the trailer (or flatbed of transport) from the side of the truck in the stacked formation into a transport rack or onto either a conveyor or pull chain system. The transport rack or the conveyor can take the trays to the staging area where they can be un-stacked manually or by using destacker equipment.

With the proposed method, the colony baskets provide a perfect transport, growing container and housing means all in one unit to move the birds through the entire process. This system can eliminate the unnecessary handling of the birds and possibly make the process more efficient.

In another implementation of the present technology, a modular colony basket (modular tray) is used for the colony basket apparatus. The modular basket can comprise a floor formed of mesh panels and modular side walls that receive a beam extending through a hinge element connecting mesh panels to the floor. As in the previously described colony basket, the modular basket is stackable with other modular baskets and can have all of the functionality and interfaces as the non-modular implementation. The modularity of the basket allows the basket or tray to be periodically disassembled for routine scheduled cleaning and sanitizing, which would be easier than trying to clean and sanitize the whole basket. Further, if only a small section of a basket/tray is damaged, the modularity provided with this implementation allows a given section to be replaced without disposing of the entire tray.

There are a number of advantages to the design of the present invention for harvesting poultry. Safety is increased for the handler and the birds and health risks are reduced. The efficiencies of handling and transporting birds is improved and the process is less labor intensive and causes less stress on animals.

Moreover, because the present invention teaches the use of a modular colony basket, a method is provided wherein the devices used to transport the birds may be easily disassembled and cleaned before being reassembled.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 4A is a colony basket rack;

FIG. 4B is a side plan view of a colony basket;

FIG. 4C is a side plan view of a colony basket;

FIG. 4D is a colony basket rack support;

FIG. 4E is a colony basket rack conveyor assembly;

FIG. 5A is a colony basket rack support;

FIG. 5B is a colony basket rack conveyor assembly;

FIG. 30C is a bottom perspective view of the floor panel of FIGS. 30A and 30B.

FIG. 36 is an illustration of the side walls of the basket of FIG. 27;

FIGS. 37A, 37B, 37C, 37D, 37E and 37F are various illustrations of a first side panel suitable for forming a side of the basket of FIG. 27;

FIGS. 38A, 38B, 38C, 38D, 38E and 38F illustrate an embodiment of a second side panel configured to mate with the first side panel;

FIG. 40 is an illustration of the inside of two stacked side panels;

FIG. 41 is an enlarged illustration of region A of FIG. 40;

Figure 1:
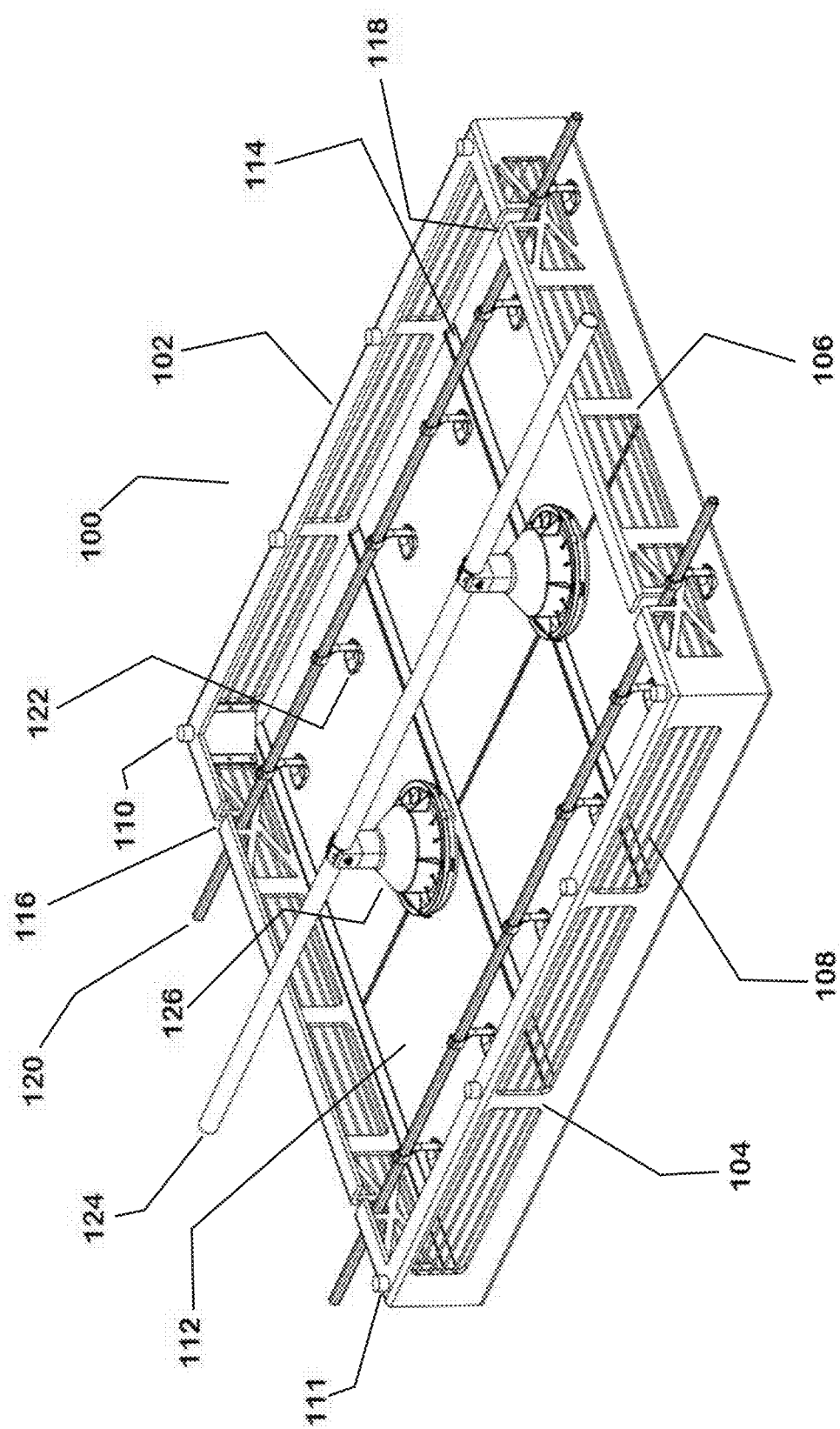
FIG. 1 is a colony basket integrated with a watering and feeding system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIGS. 1-45 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the technology is a single colony basket design adapted to be used throughout poultry processing from the hatchery, through growing and to production. The colony basket includes components designed for the growing process and components designed for transport. The colony basket is adapted for an automated loading system including a stackable tray design, a transport system, and unloading and storing system.

The details of the invention and various embodiments can be better understood by referring to the figures of the drawing.

Referring to FIG. 1, a colony basket integrated with a watering and feeding system is shown. The colony basket growing assembly 100 is shown with a colony basket 102 having vented vertically upright side walls 104 and 106 extending between a top rim flange and a bottom rim flange. The vertically upright side walls include vented areas 108. The top rim flange includes a plurality of stand-offs as represented by items 110 and 111. The stand-offs can provide spacing between colony baskets when they are stacked one on top of the other. The bottom rim flange can include complimentary recessed receptacles to receive the stand-offs therein in order to interlock the stacked colony baskets and in order to prevent or resist lateral and longitudinal movement. The top rim flange and the adjacent side wall can have vertical slots 116 and 118 for receiving the water channel and water trough assembly 120 and 122. The colony basket 102 can also be integrated with a feed channel 124 and feed trough 126. The feed assembly and the watering assembly can be more generally referred to as sustenance assemblies that can be elevated above the basket for basket removal and installation and ultimately lowered into the basket. The parametrical top rim flange defines an upward facing opening through which birds can be inserted into the basket. The downward facing opening is closed by a floor 112 providing support and a trap for debris. The floor 112 can have placed thereon elongated elevator strips 114 over which a flexible mesh flooring (Not Shown) can be supported and installed. The flexible mesh flooring, not shown, can have small openings through which debris can fall downward through the mesh flooring and be trapped by the floor 112. The flexibility of the mesh flooring prevents injury to birds standing thereon. The colony basket growing assembly 100 is shown in its configuration when it is integrated within a colony system whereby the birds are housed within the colony basket and provided nourishment for the growing process. For another embodiment, the floor 112 can be a mesh floor and the strips 114 can support the mesh floor. A further modification to this embodiment can include an under panel or cover that removably attaches immediately underneath the mesh floor 112.

Figure 2B:
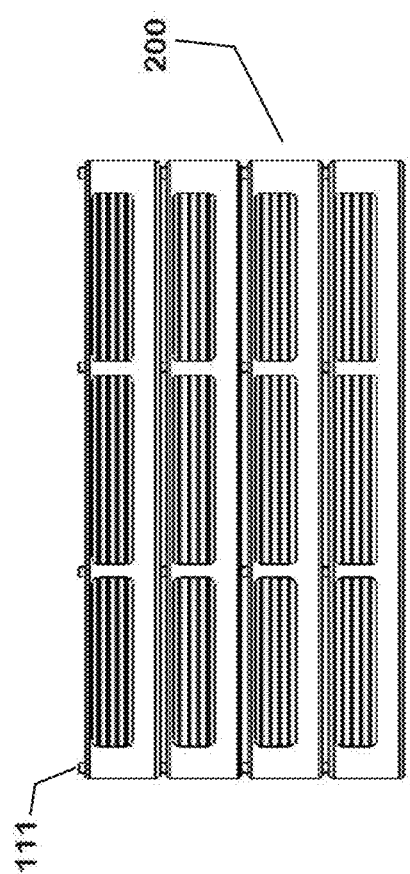
FIG. 2B is a side view illustration of stacked colony baskets.
Figure 2C:
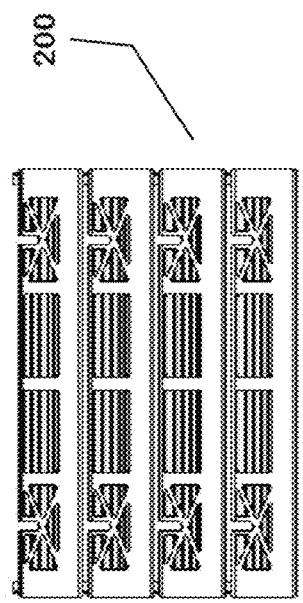
FIG. 2C is an end view illustration of stacked colony baskets.
Figure 2A:
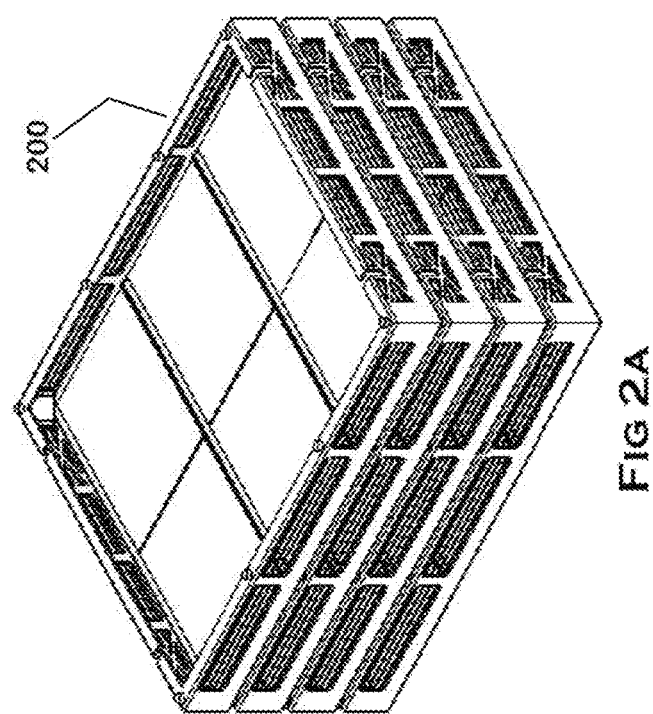
FIG. 2A is a perspective view illustration of stacked colony baskets.

Referring to FIG. 2, a colony basket stack is shown. In FIGS. 2A-2C various views of a colony basket stack 200 is shown. The colony baskets are shown stacked one on top of the other. The colony basket stack 200 can be transported in this configuration and as seen in the various views, the colony baskets are vertically spaced one with respect to the other by the stand-offs 111 and 110. The bottom facing rim of the basket above can be configured with a mating receptacle recess for receiving the stand-off of the basket immediately below.

Figure 3B:
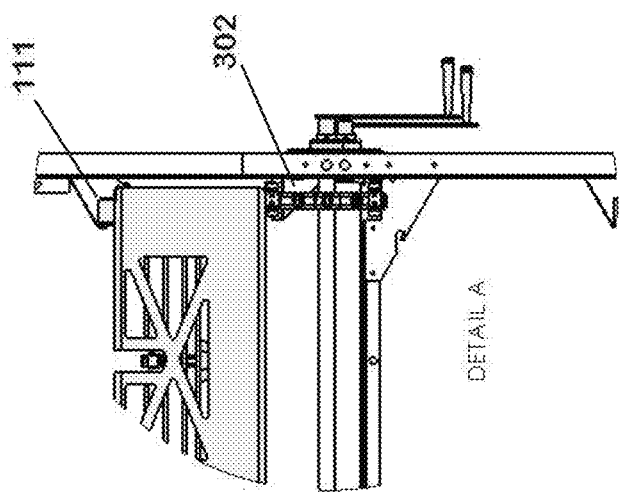
FIG. 3B is an illustration of a sectional detail of a colony basket rack.
Figure 3A:
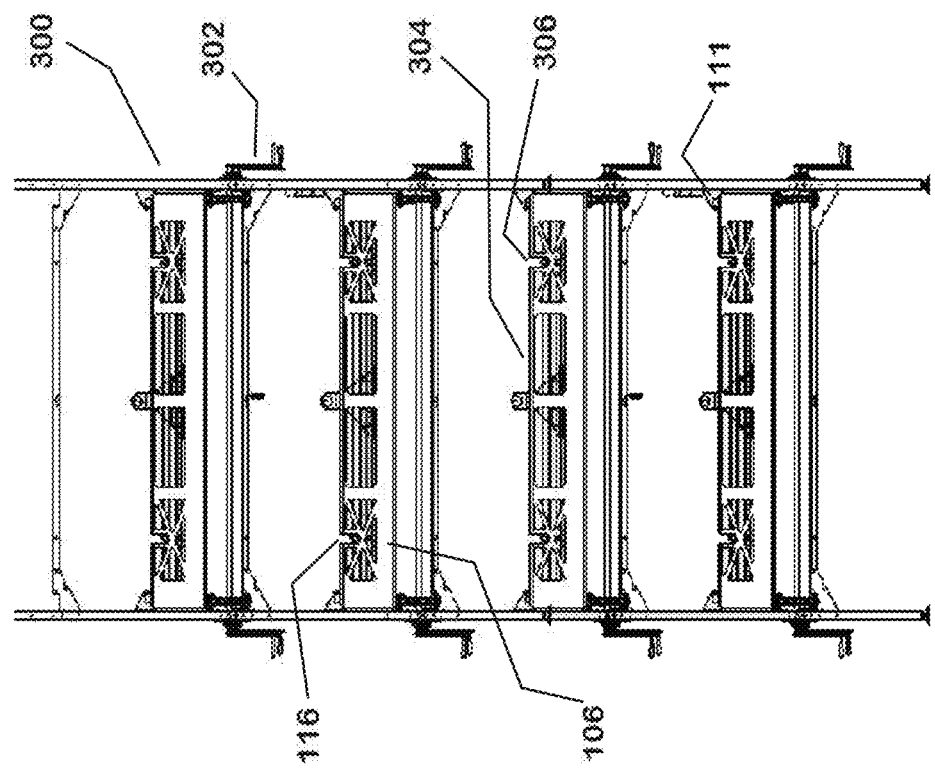
FIG. 3A is an illustration of a colony basket rack.

Referring to FIG. 3, a colony basket rack is shown. A rack assembly 300 is shown and configured for a colony system. The rack transfer and conveyor assembly 302 is shown which is utilized to support the colony basket as well as transfer the colony basket into and out of the colony racks of the colony system. The colony system configuration is shown with a feed assembly 304 and a watering assembly 306. The slot 116 shown where the water assembly 306 can be lowered therein. The feed assembly 304 and the water assembly 306 is shown in a lowered position but can be elevated above the colony basket using a wench system adapted to raise and lower the assemblies so that the basket can be inserted and removed from the colony basket rack without being obstructed by the assemblies. Other drawer designs are not adapted such that watering and feeding assemblies can be raised above or lowered into the container.

Referring to FIGS. 4A through 4E, a colony basket rack is shown, a side plan view of a colony basket is shown, a side plan view of a colony basket is shown, a colony basket rack support is shown and a colony basket rack conveyor assembly is shown. FIGS. 4A-4E show the various components of the rack assembly 300 within the colony system configuration. The colony baskets are longitudinally installed within the rack assembly 300. The longitudinal installation aligns the vertical slots of the colony baskets to be aligned with the water trough system. The components of the transfer system including the support transfer rack 400 and the rack transfer conveyor assembly 302 is also shown.

Referring to FIGS. 5A-5B, a colony basket rack support is shown and a colony basket rack conveyor assembly is shown. FIGS. 5A and 5B show further detail of the support transfer rack 400 and the rack transfer conveyor assembly 302. The rack transfer conveyor assembly 302 includes a conveyor belt 500 and a conveyor roll assembly 502. The rack transfer conveyor assembly 302 also includes a hydraulic cylinder extension arm 504 that can be utilized to engage the baskets with engagement members 506 and extend to transfer a colony basket stack from one rack to another and/or from one rack to a transport system. The basket cylinder arm and basket retention bar 504 can be actuated to longitudinally extend and retract during retrieval and insertion of a basket. The basket retention bar 504 can include basket engagement members member that engages the basket by applying lateral pressure against the side of the basket and/or engages a complimentary receptor configured to receive the engagement member. The retention bar and engagement member can be rotated about pivot 508 in order to rotate upward to engage a basket or to rotate outward and downward away from the basket. The support transfer rack 400 can support a basket and the support transfer rack can be integral with a rack allowing the transfer rack 400 to elevate or lower the basket with the rack when it is supporting a basket.

Figure 6:
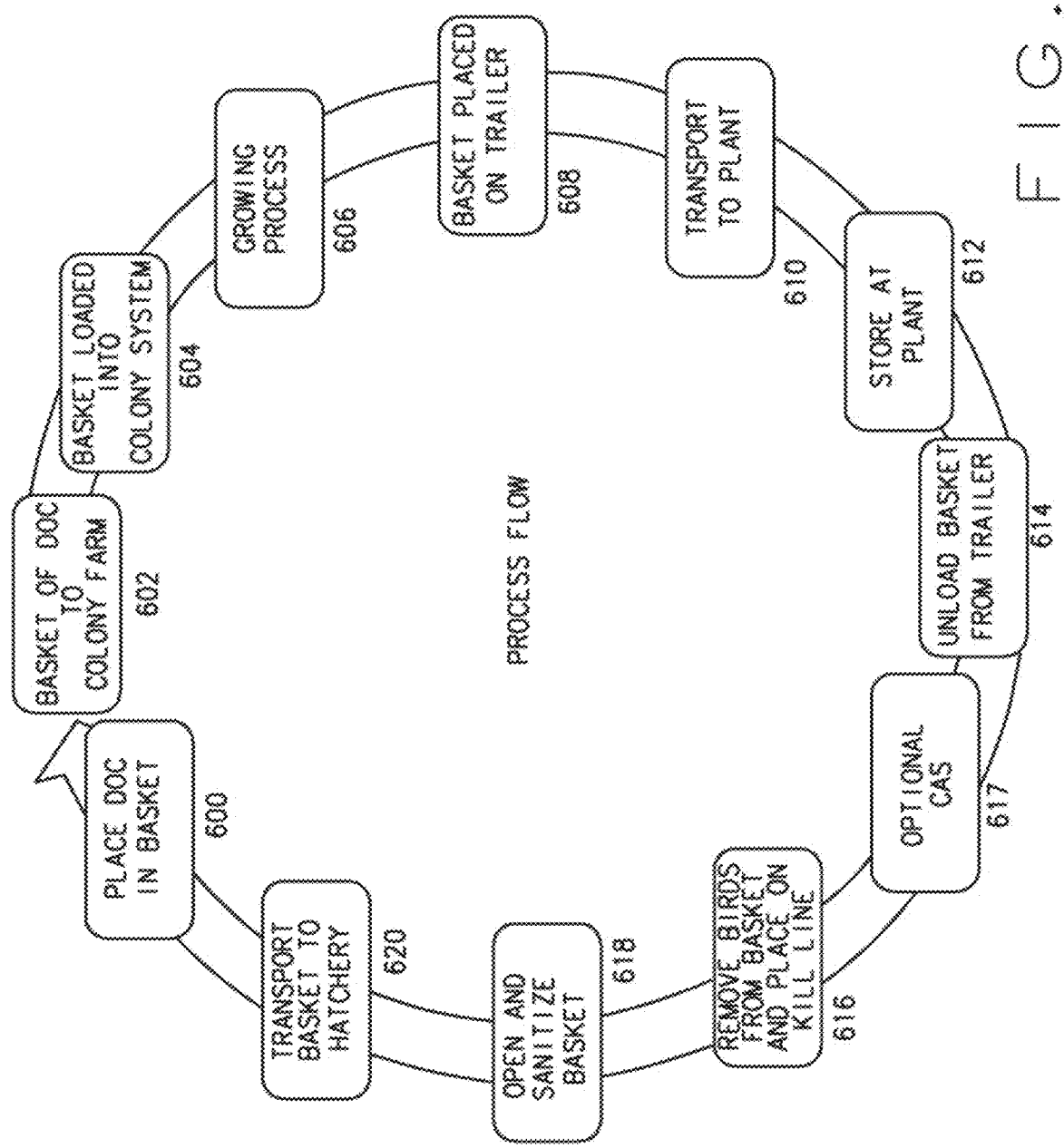
FIG. 6 is a flow diagram of the colony basket methodology.

Referring to FIG. 6 a flow diagram of the colony basket methodology is shown. FIG. 6 shows a flow diagram of a circular process utilizing a system of colony baskets throughout the entirety of the process. A given colony basket will retain the same colony (grouping) of birds throughout the process. Initially a colony basket is filled with DOC at a hatchery as reflected by step 600. Groupings of colony baskets each containing their own individual grouping of birds are then transferred to a growing house (colony farm) 602 where the baskets are loaded into a colony system as reflected by 604. The birds are retained in the same colony basket in which they were originally installed throughout the growing process and the growing process proceeds as reflected by 606. The colony baskets are integrated with the watering and feeding systems within the colony system of the growing house. Once the growing process has been completed, the birds are retained in their original colony basket and the baskets are removed from the colony system and transferred to the trailer of a transport as reflected by step 608. The transport carries the grouping of baskets to a processing plant where the colony baskets are stacked and stored for future processing as reflected by steps 610 and 612. Again, each of the grouping of birds are retained in their original colony basket throughout the process. The baskets are unloaded as reflected by step 614 and transferred to the kill line as reflected by step 616 or 617 which may be a controlled atmosphere stunning system (CAS) path and there can be separate paths that can be chosen. The birds can be removed from the original baskets in which they were placed and installed on shackles for further processing. The baskets can then be sent through a cleaning process as reflected by step 618. The cleaned baskets can then be transported to a hatchery 620 and a new batch of DOC can be installed into the baskets and the process can repeat itself.

Figure 7:
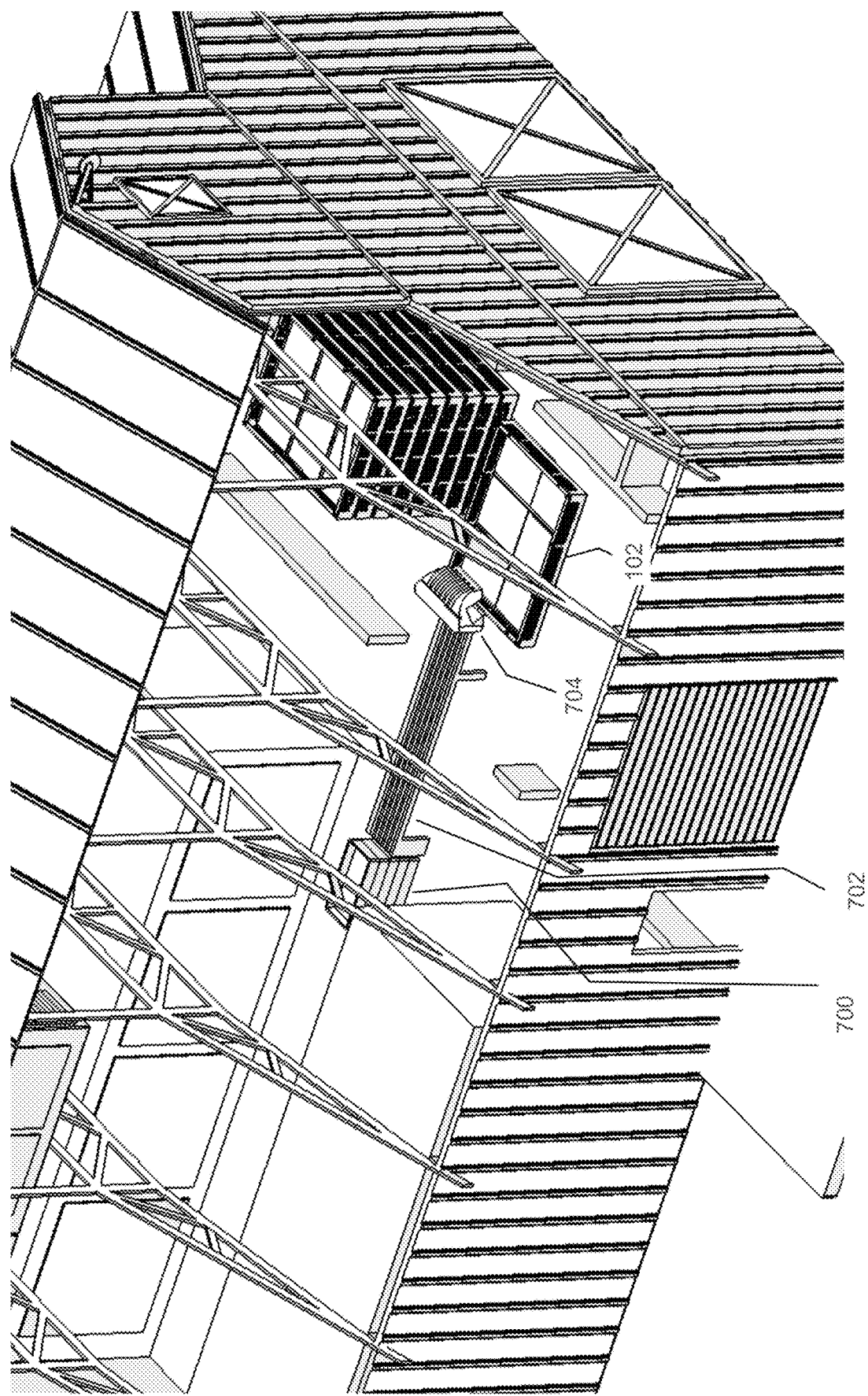
FIG. 7 is an illustration of the hatchery conveyor, DOC counter and egg shell separator.

Referring to FIG. 7, an illustration of the hatchery conveyor is shown. FIG. 7 is an illustration of a hatchery system where groupings of DOC 700 can be placed on a conveyor system 702 and transferred into colony baskets by a transfer system 704 and the baskets filled with DOC can then be stacked and transferred to a growing house containing a colony system. The transfer system 704 installs the DOC in a basket and separates the DOC from the shells that remain after the bird hatches.

Figure 8:
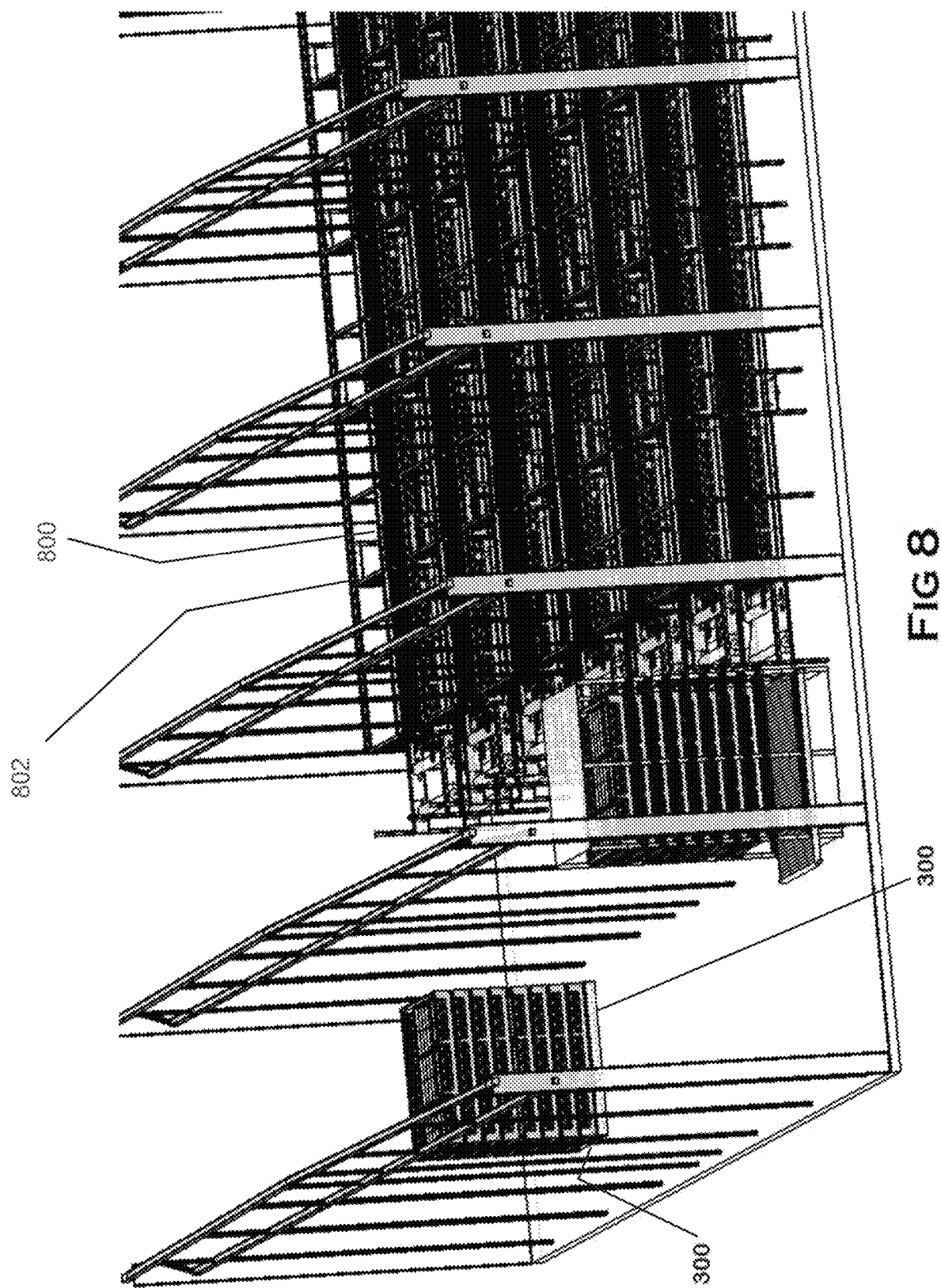
FIG. 8 is an illustration of a colony system.

Referring to FIG. 8, an illustration of a colony system is shown. FIG. 8 is an illustration of a colony system where rows of rack assemblies 800 are aligned side-by-side in which colony systems are installed as reflected by Items 800 and 802 respectively. A rack assembly 300 can be utilized for transferring the colony baskets from the rack to the colony system. The colony baskets can be longitudinally installed within the colony system for the growing process. The colony basket stacks 200 can be installed on wheeled platforms for transporting the colony baskets stacks as reflected in the illustration.

Figure 9:
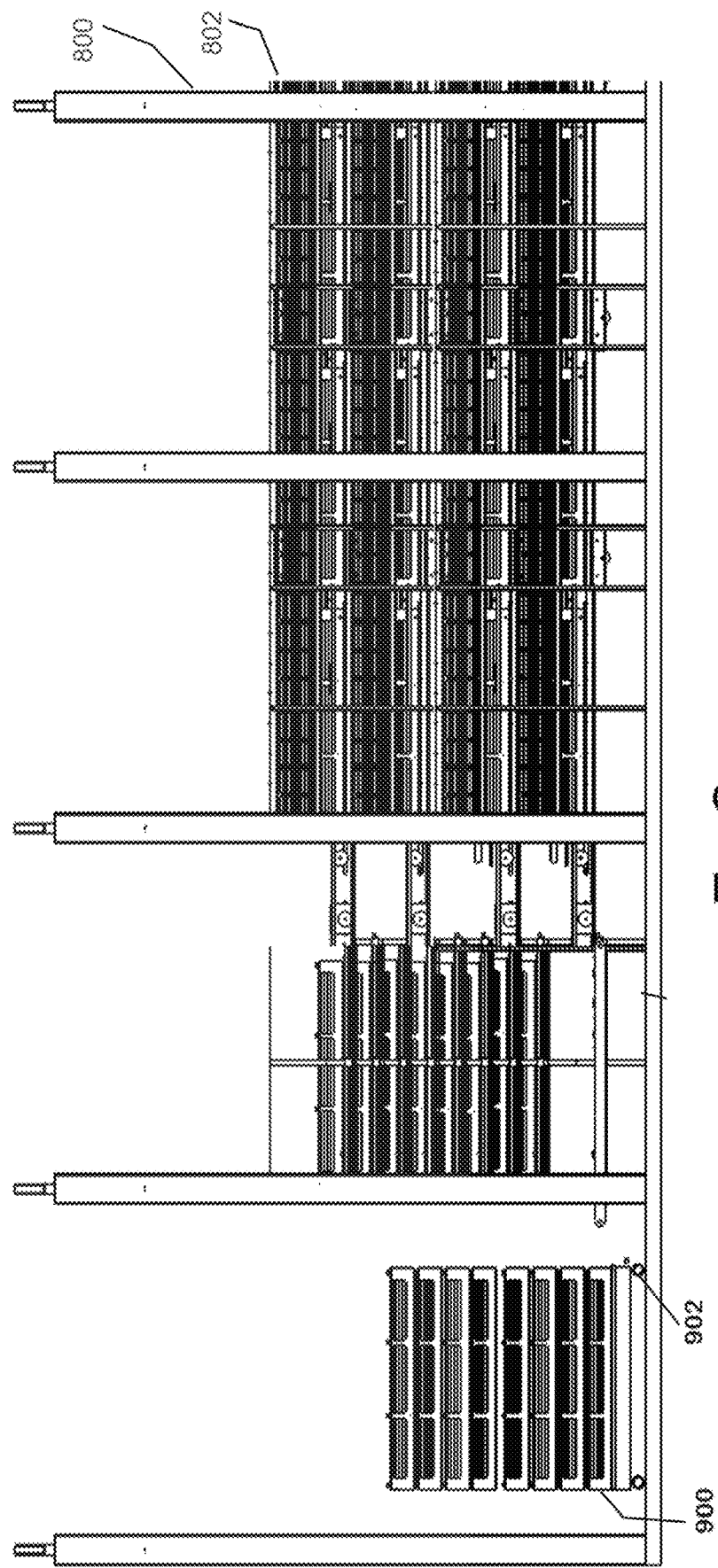
FIG. 9 is an illustration of loading colony baskets from a rack to a colony system.

Referring to FIG. 9, an illustration of loading colony baskets from a rack to a colony system is shown. FIG. 9 is a further illustration of transferring a colony basket stack 900 on a wheeled platform 902 to a colony rack 302 for insertion of the colony baskets into the colony system as reflected by Items 800 and 802.

Figure 10:
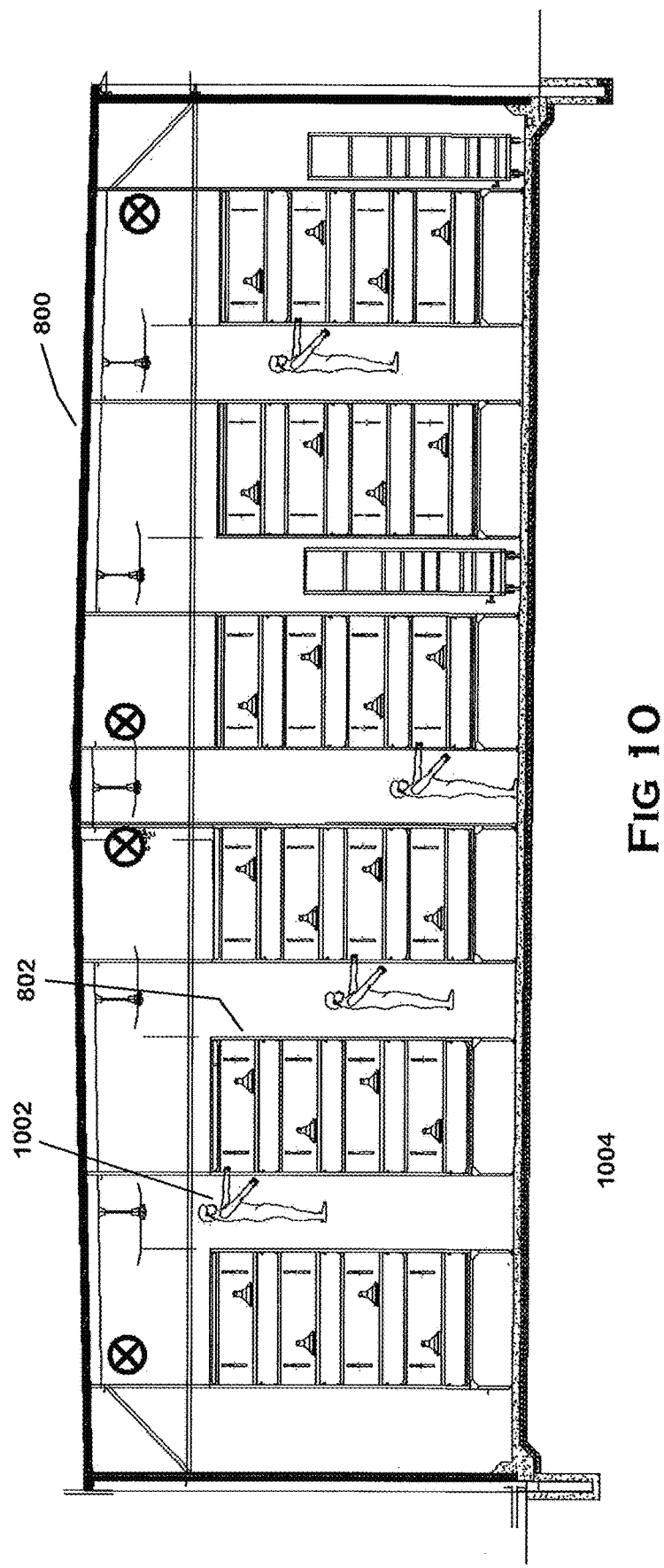
FIG. 10 is an illustration of the colony system operation.

Referring to FIG. 10, an illustration of the colony system operation is shown. FIG. 10 is an illustration of the growing process in operation whereby workers 1002 utilizing platforms 1004 can tend to the growing process by maintaining the watering and feeding systems. The water and feed assemblies are shown in an elevated position above the basket. When the assemblies are elevated, the baskets can be readily inserted and removed.

Figure 11:
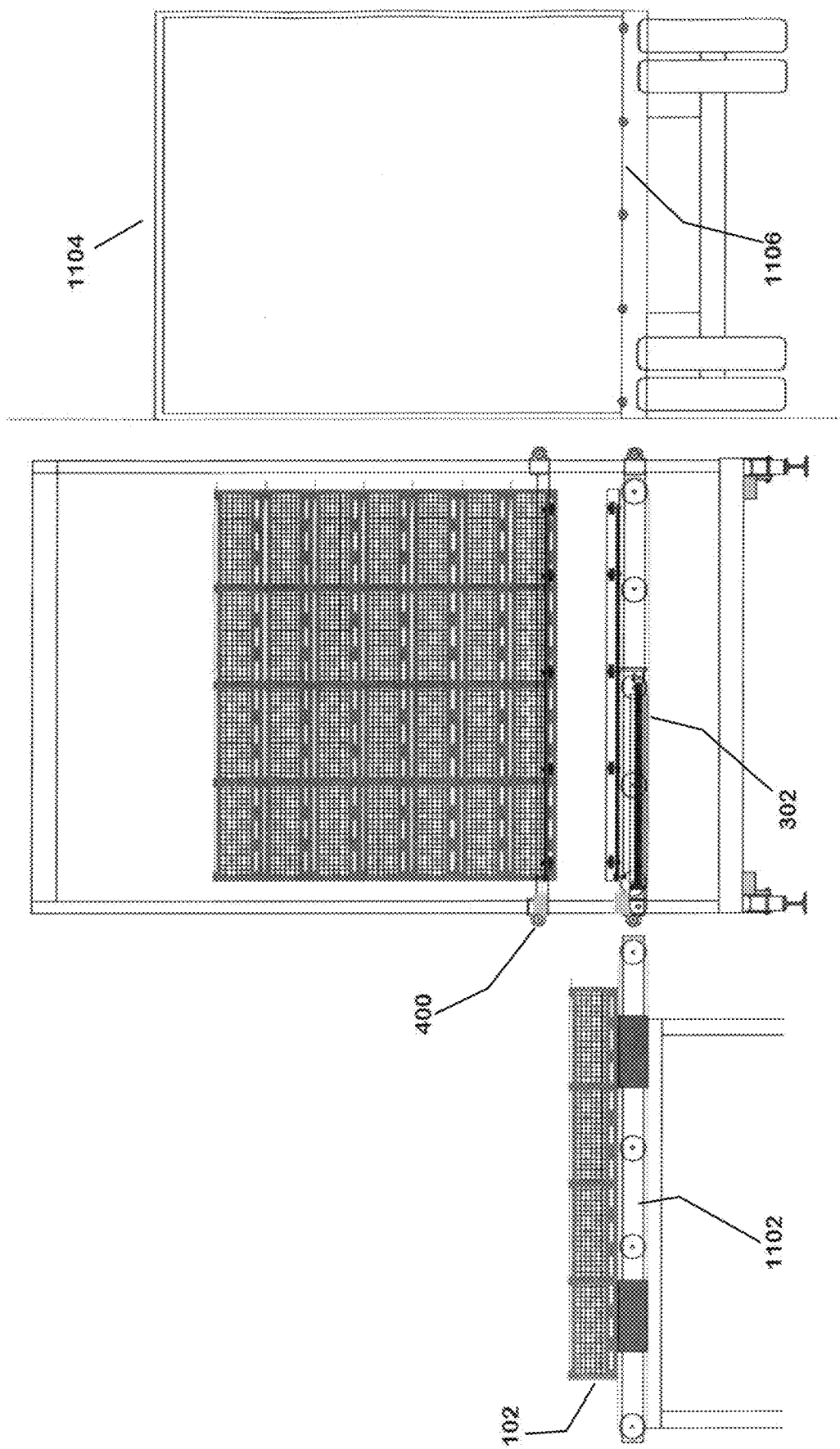
FIG. 11 is an illustration of a transport loading system.
Figure 12:
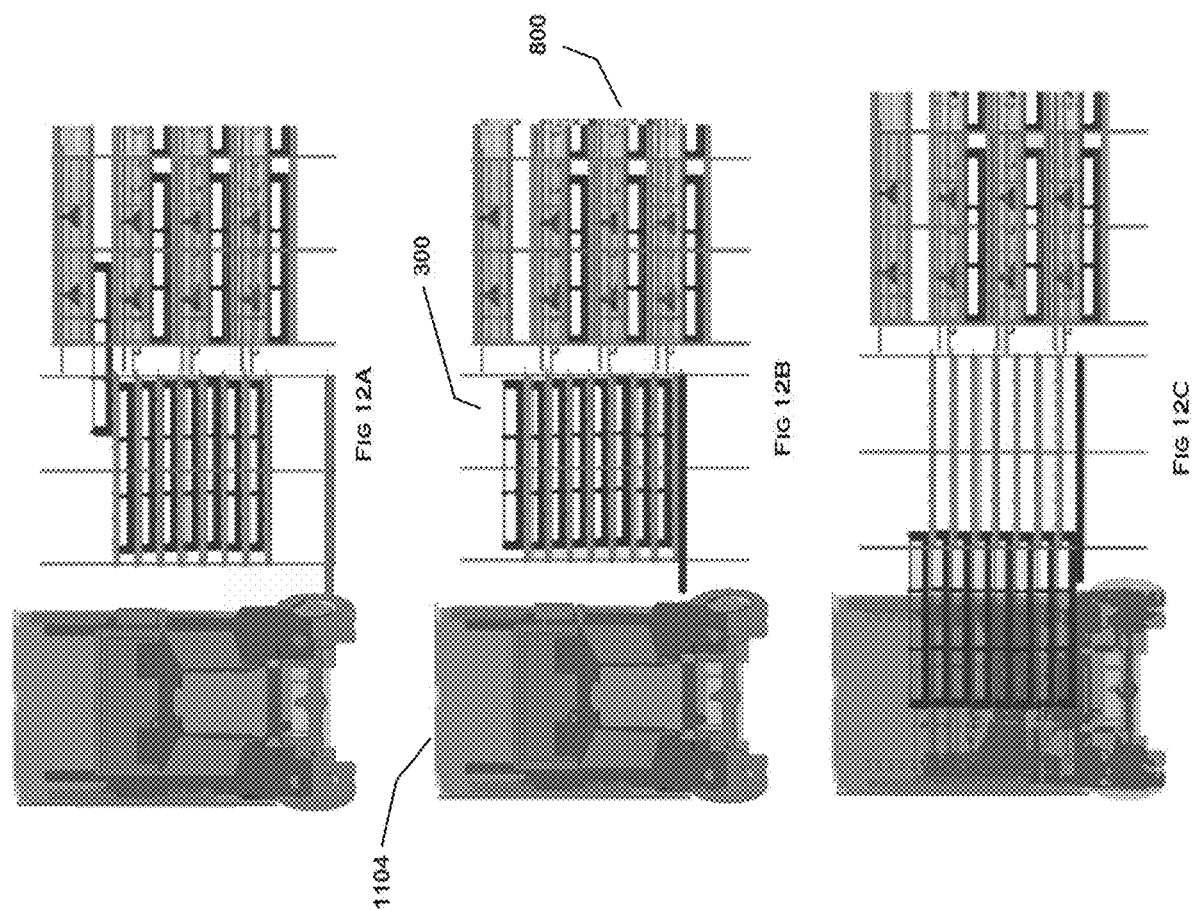
FIGS. 12A, 12B and 12C are an illustration of loading a transport.
Figure 13:
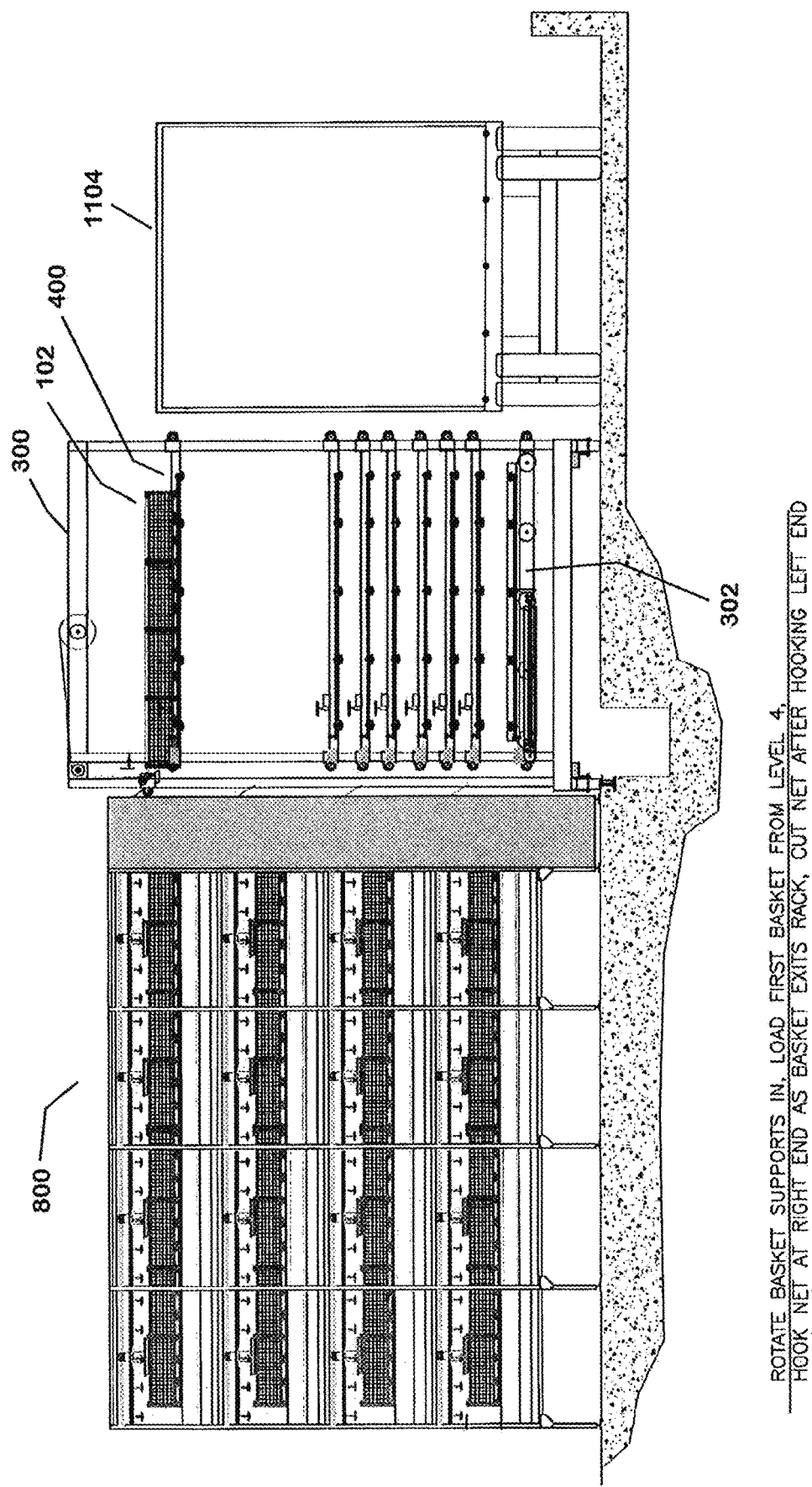
FIGS. 13, 14, 15, 16, 17, 18 and 19 are an illustration of transferring colony basket stacks from a colony system to a trailer.

Referring to FIG. 11, an illustration a transport loading system is shown. FIG. 11 is an illustration of transferring colony baskets 102 from a colony system into a rack assembly 300 for transfer into the transport 1104 having a flatbed 1106. The colony baskets 102 can be transferred by a transfer conveyor 1102 into a rack assembly 300. The rack assembly 300 can then be utilized to load the transport 1104 by placing the colony basket stacks on the flatbed of the transport.

Referring to FIG. 12A-12C, an illustration of loading a transport is shown. FIGS. 12A-12C is a further illustration of transferring colony baskets from the colony system onto a rack assembly for placement on a flatbed of a transport.

Figure 14:
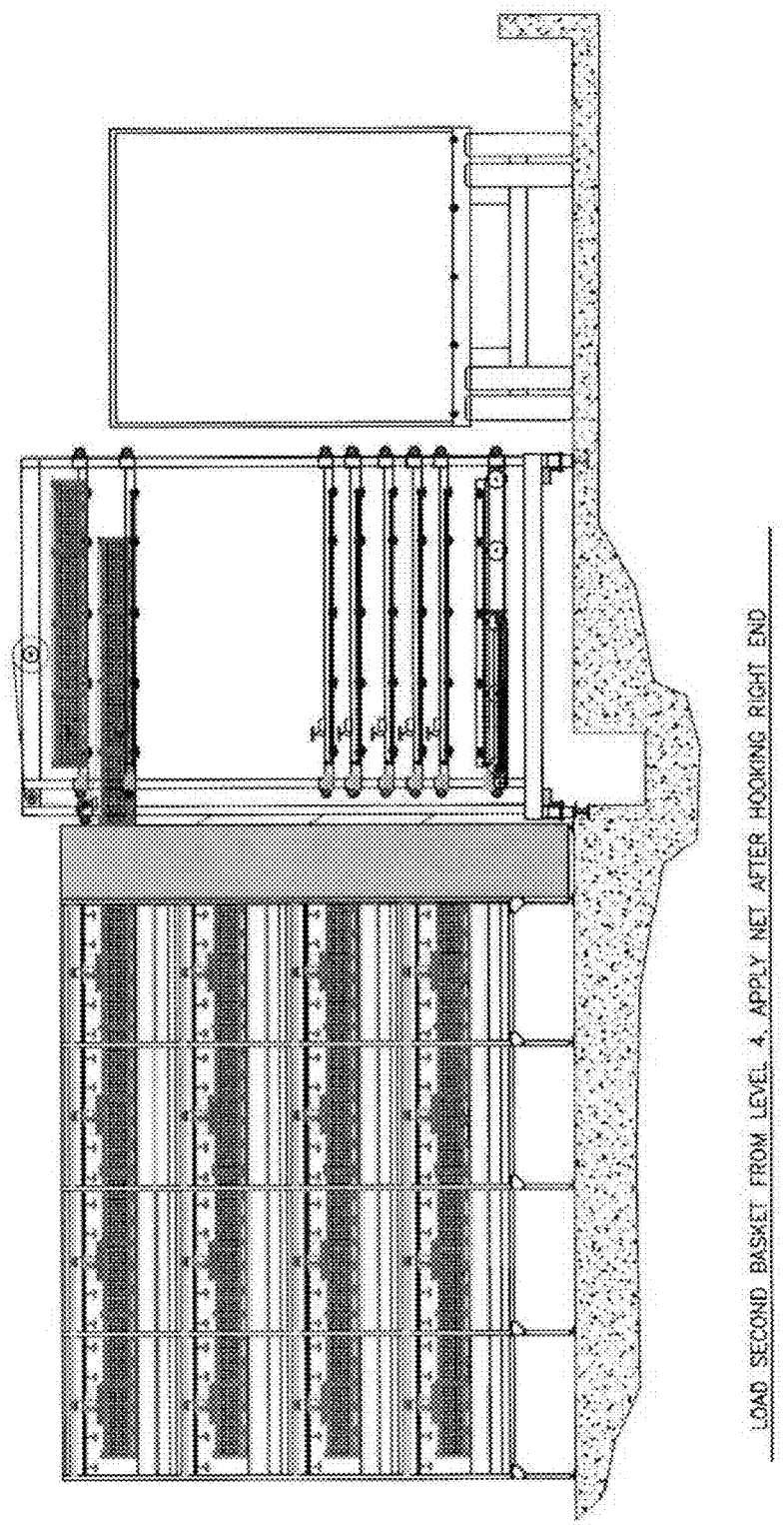
Figure 15:
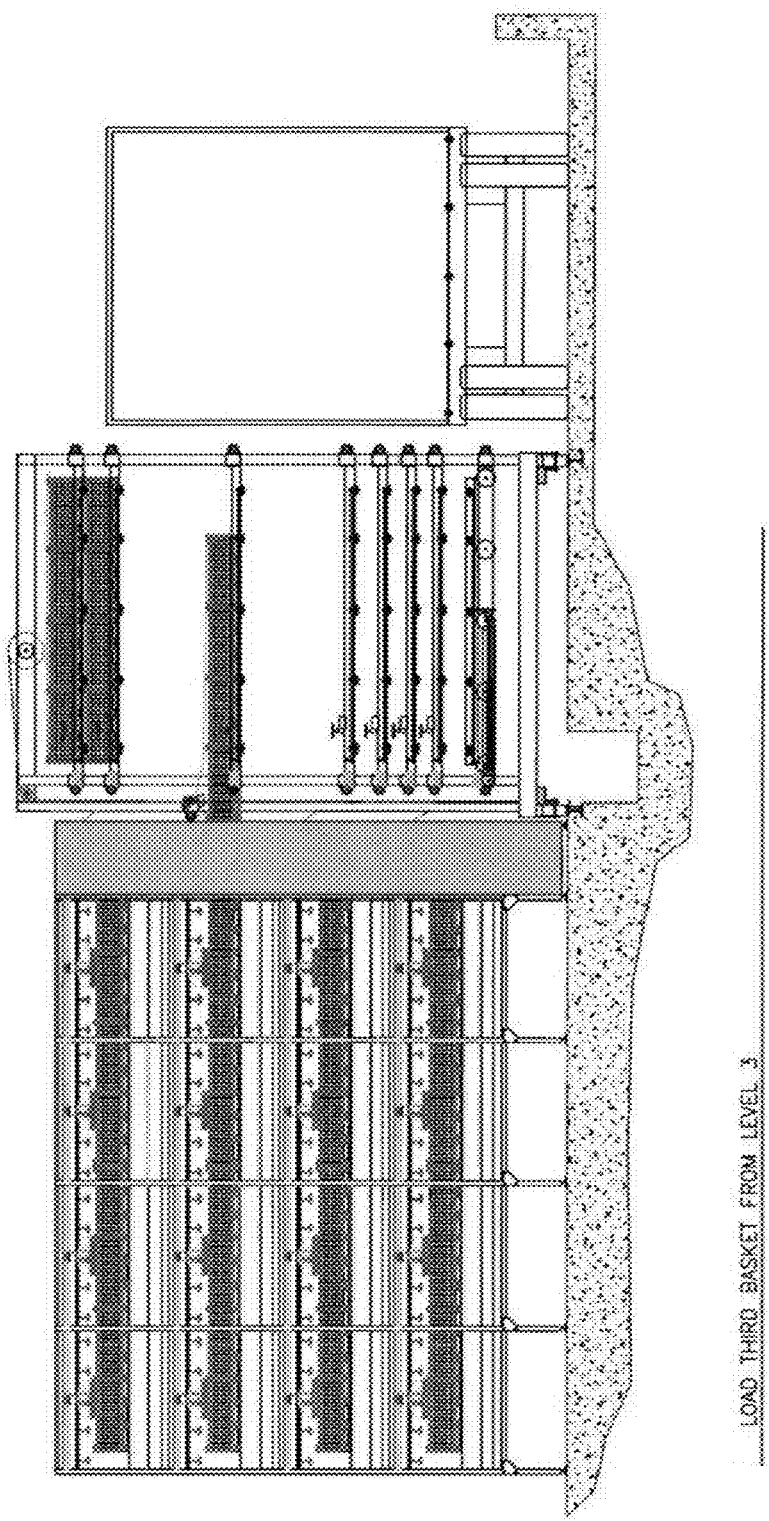

Referring to FIG. 13-19, an illustration of transferring colony basket stacks from a colony system to a trailer is shown. FIGS. 13-19 provide an illustration of a step-by-step process for transferring colony baskets from the colony system onto the flatbed of a transport. As illustrated, the basket supports 400 are rotated to receive the first colony basket from level 4. The basket is loaded onto the basket support and a netting material can be installed or draped over the top of the colony basket 102 to retain the birds therein. FIG. 14 illustrates loading a second basket from level 4 and again applying a netting or other covering material over the top of the basket. FIG. 15 illustrates loading a third basket from level 3 and again applying the netting material and draping over the top of the basket. This process is repeated for each of the levels of the colony system as two baskets are loaded from each level and then stacked with the previously loaded baskets.

Figure 16:
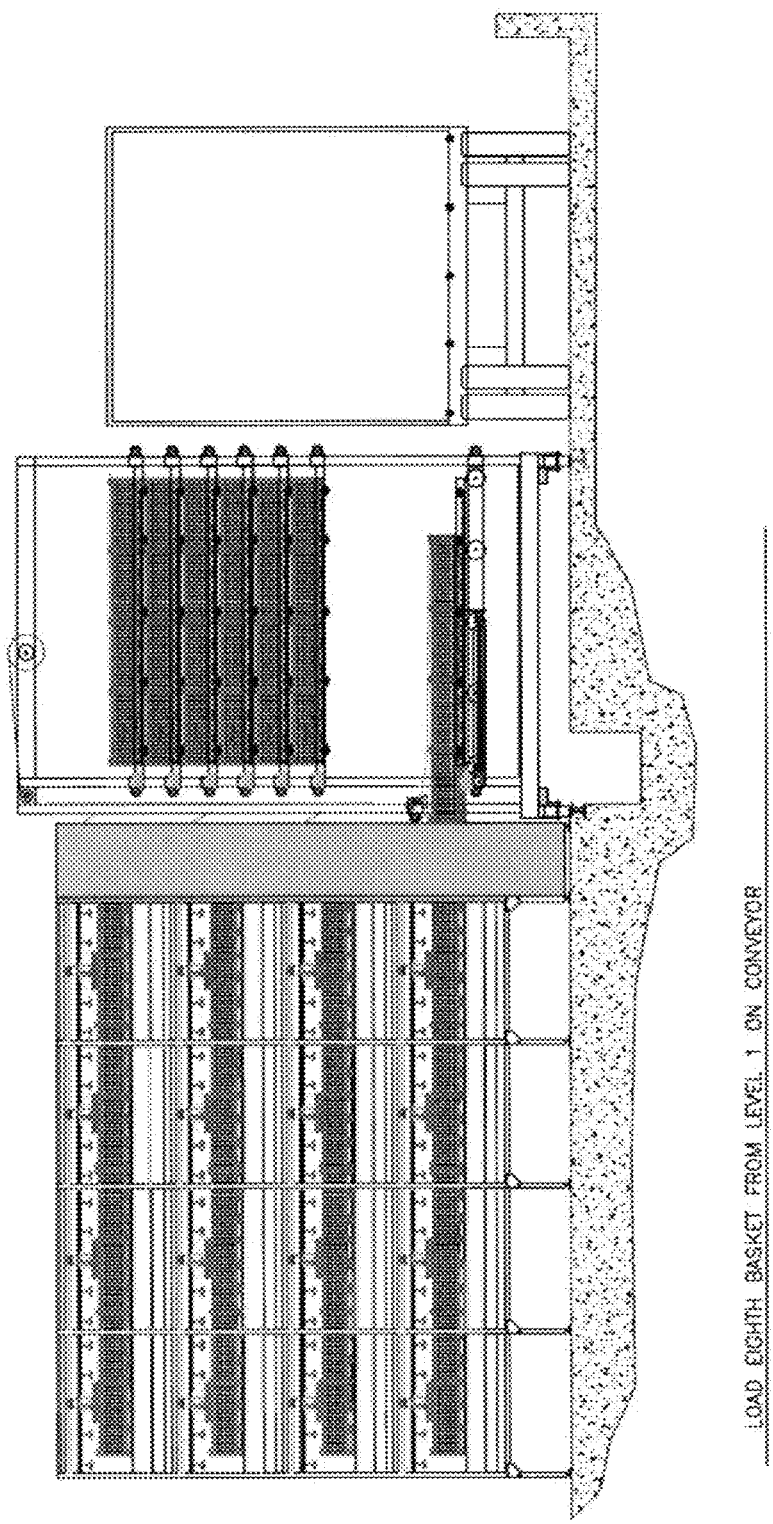
Figure 17:
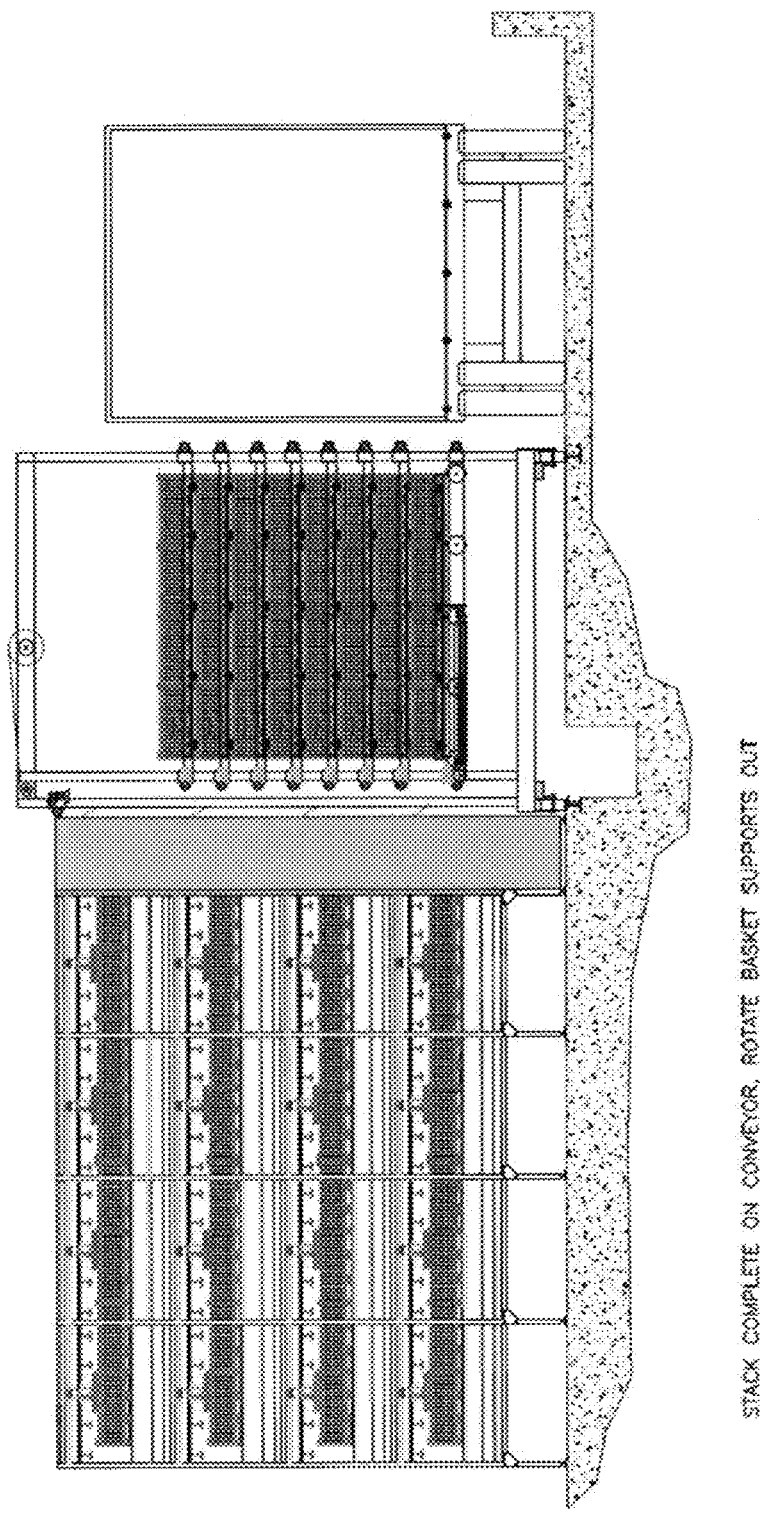
Figure 18:
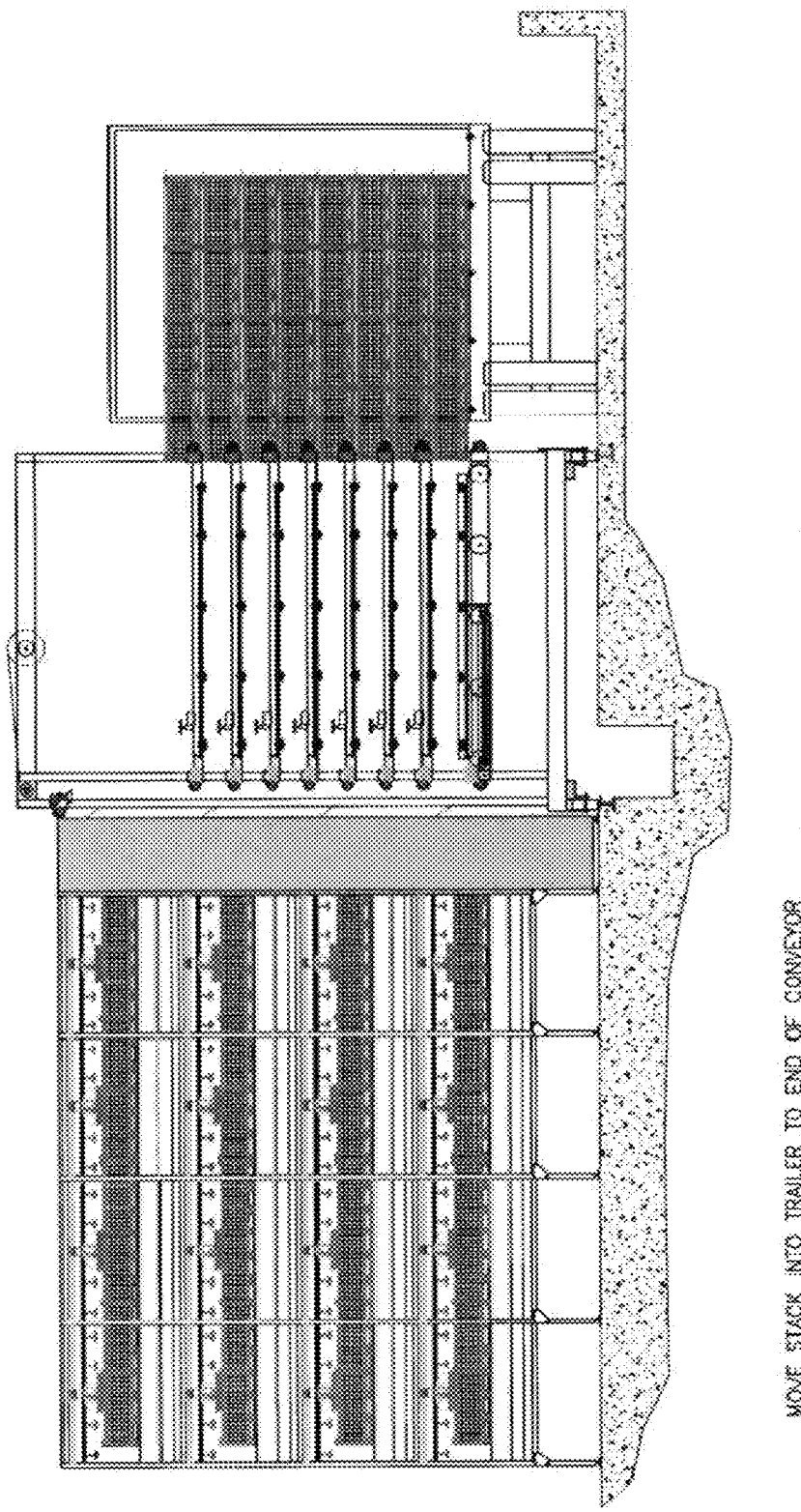
Figure 19:
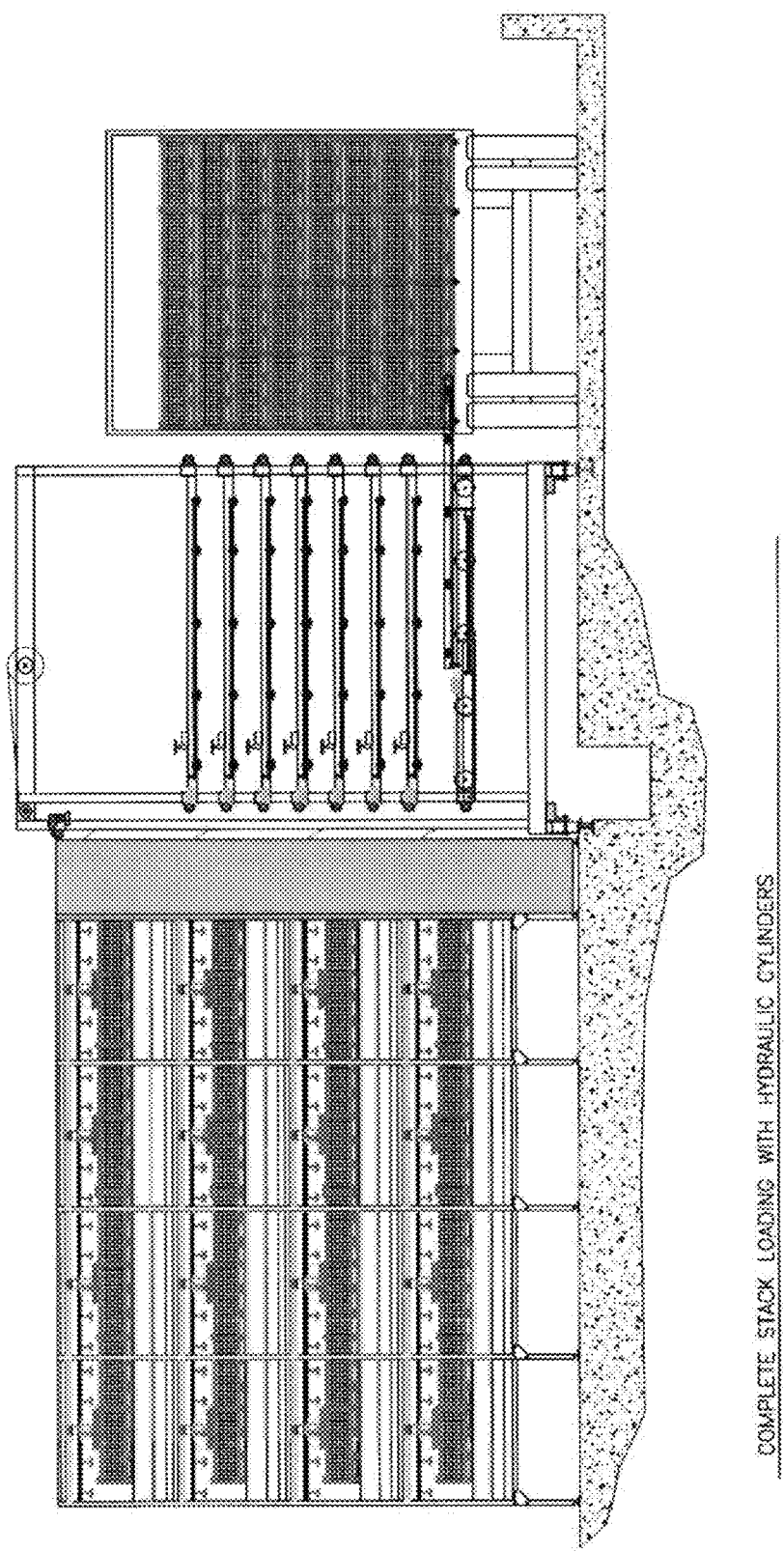

FIG. 16 reflects loading the eighth and final basket from level 1 onto the rack transfer conveyor assembly for subsequent stacking of the colony baskets. When a complete stack has been loaded, the basket supports can be rotated outward such that the rack transfer conveyor assembly can begin transferring stacks onto the transport. FIG. 17 illustrates the completed stack and ready for rotating the basket supports outward to ready the loading of the basket stacks onto the transport. FIG. 18 illustrates the rack transfer conveyor assembly conveying the basket stacks onto the flatbed of the transport. FIG. 19 illustrates the completion of the stack loading utilizing the hydraulic cylinder extension arm 1902 for placing and loading the stack onto the flatbed of the transport.

Figure 20:
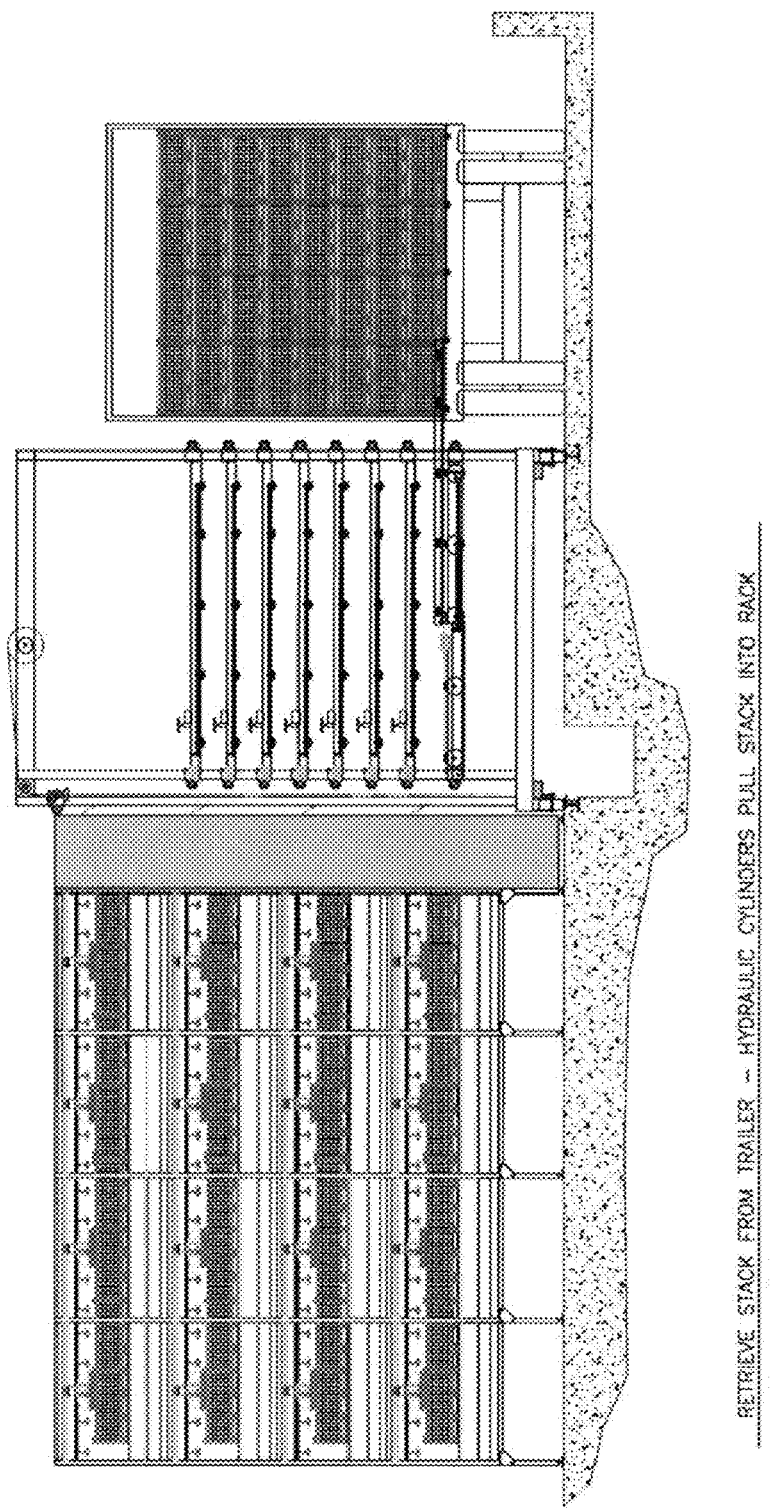
FIGS. 20, 21 and 22 are an illustration of retrieving colony basket stacks from a trailer.
Figure 21:
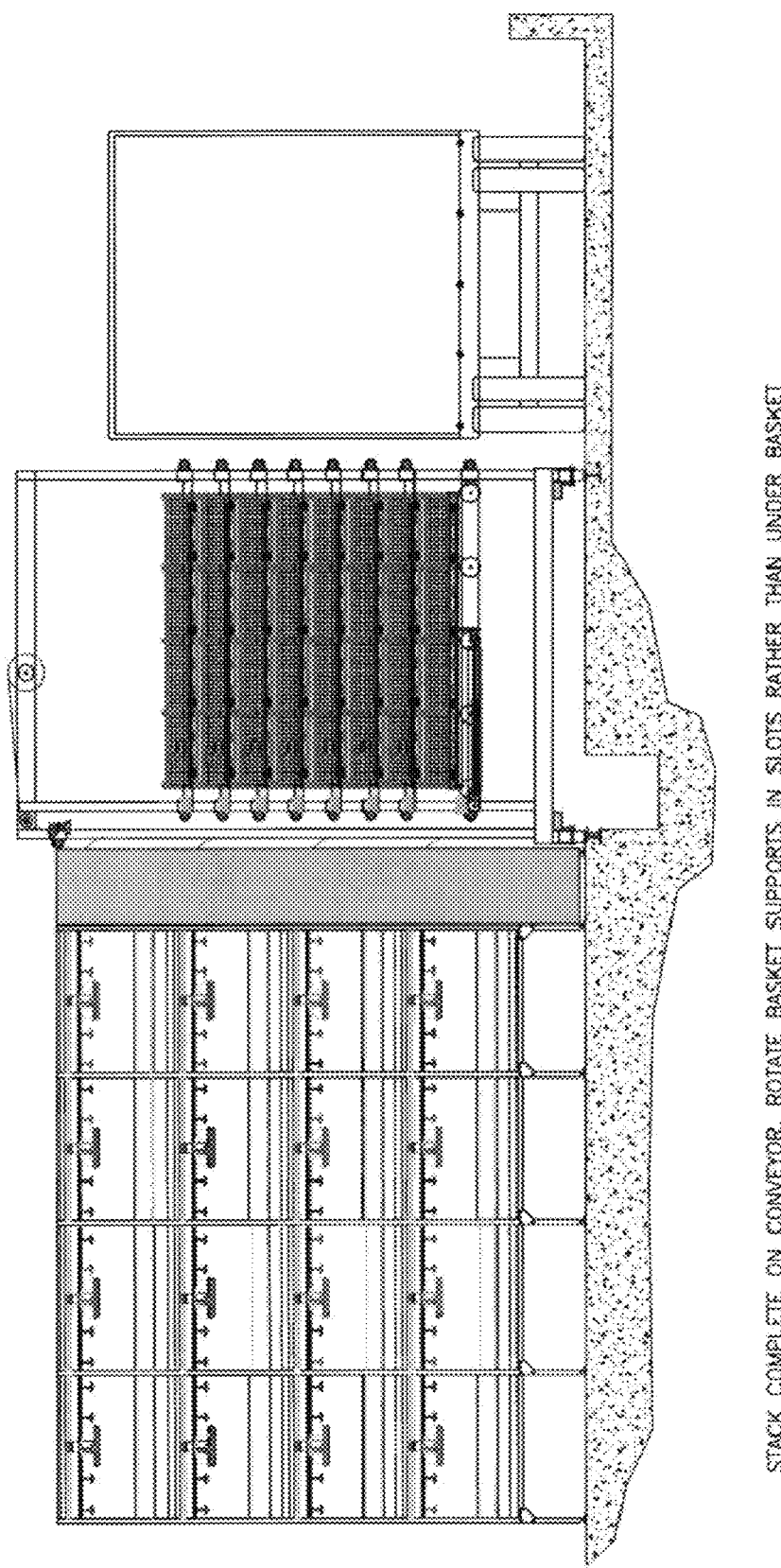
Figure 22:
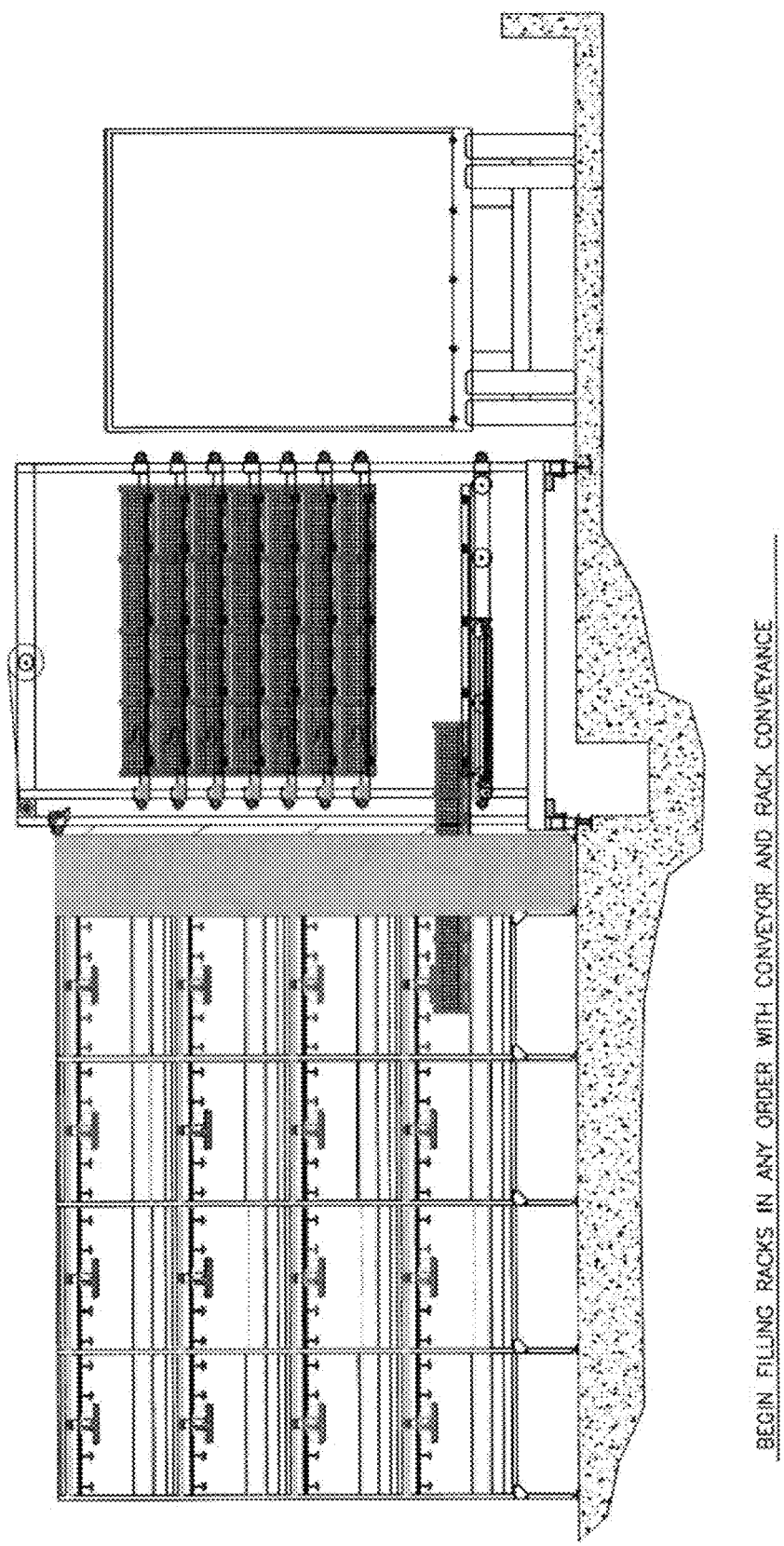

Referring to FIGS. 20-22, an illustration of retrieving colony basket stacks from a trailer is shown, which is essentially the reverse of the process for loading a trailer. FIG. 20 is an illustration of subsequently retrieving the basket stacks from the trailer using the hydraulic cylinder arm to engage and pull the stack onto the rack assembly. The hydraulic cylinder arm pulls the stack onto the rack and onto the conveyor for subsequently engaging the support transfer racks for installing and longitudinally inserting the basket into the colony system. FIG. 21 illustrates the beginning of the process for transferring the basket stacks into the colony system. The transfer support racks can be rotated to engage the colony baskets to begin the process of transferring the baskets into the colony system. A reversal of the previous process can be performed by installing two colony baskets per level, beginning with level 1 and moving upward to level 2, 3 and 4. FIG. 22 is an illustration of this process.

Figure 23:
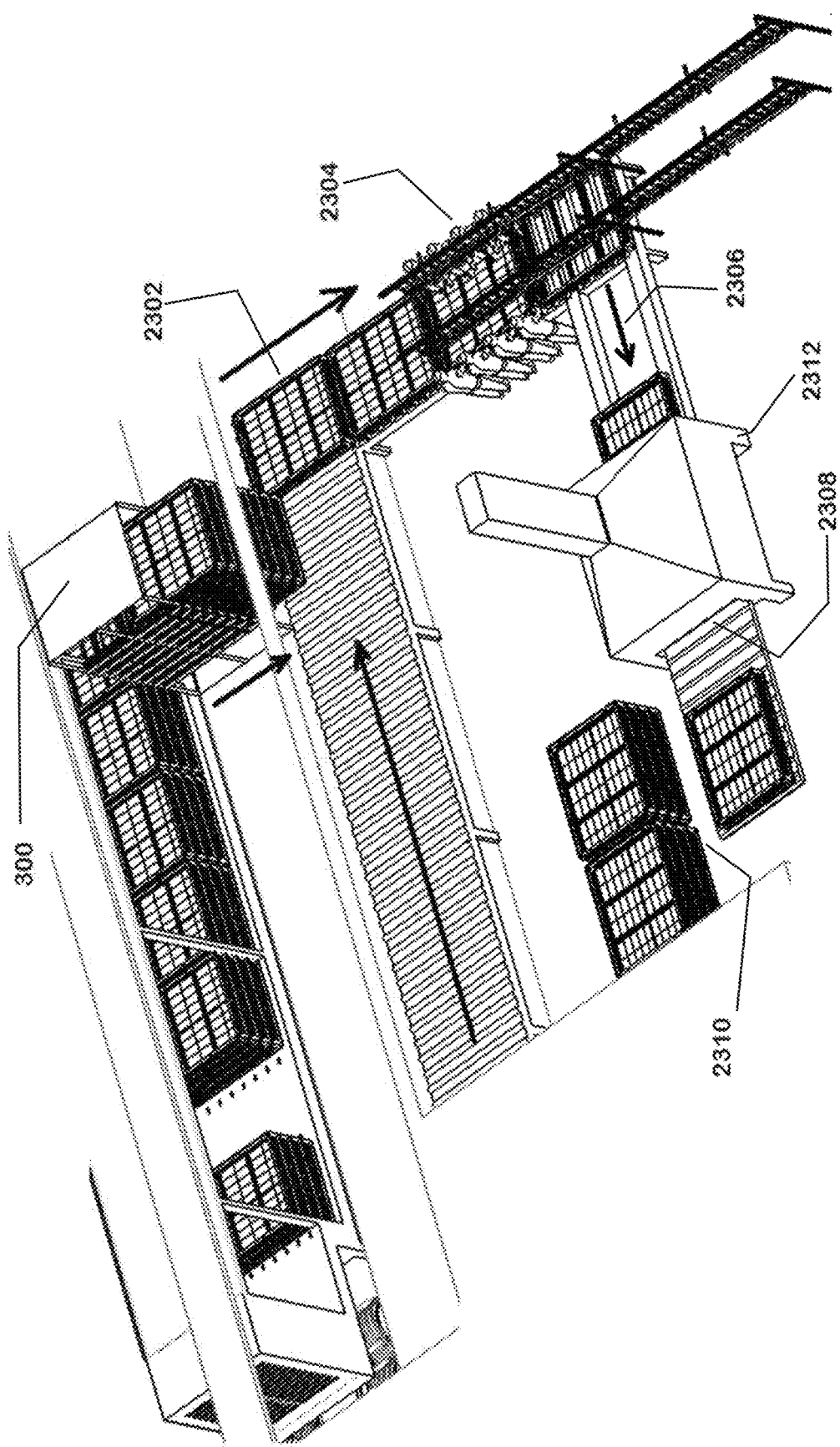
FIGS. 23 and 24 are an illustration of transferring colony baskets to a kill line.
Figure 24:
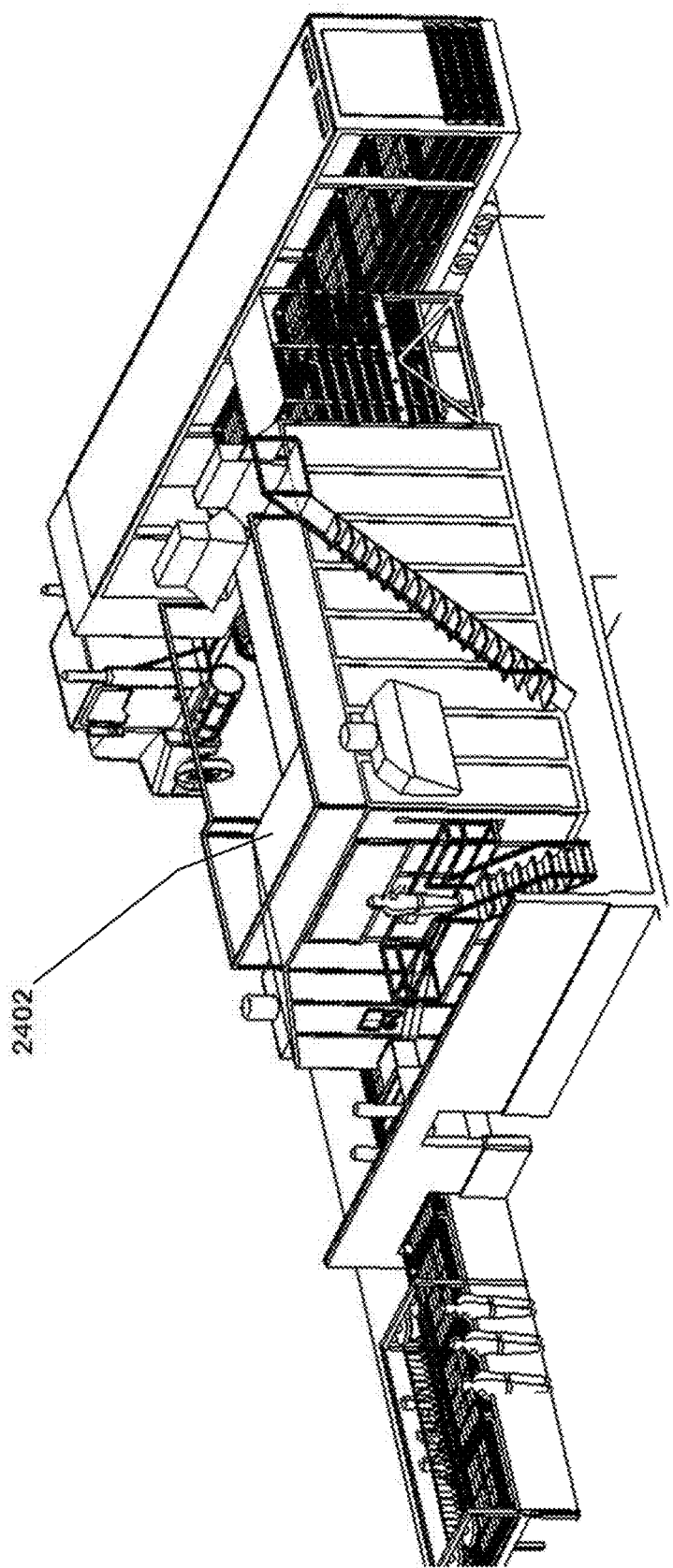

Referring to FIGS. 23-24, illustrations of transferring colony baskets to a kill line are shown. FIG. 23 is an illustration of transferring the colony baskets from the transport to the rack assembly 300 and then transferring the colony baskets onto the colony basket entry conveyor 2302 to convey the colony baskets to the rendering station 2304. Once the birds have been unloaded from each colony basket, the empty colony basket can then be transferred to the colony basket exit conveyor 2306. The colony baskets can then proceed through and along the colony basket wash conveyor 2308 which carries the colony baskets through the colony basket washer 2312. The colony baskets once they are washed can then be reconfigured in a colony basket stack 2310 where the process can be started again.

FIG. 24 is an illustration of a colony basket entry station 2402 which is another embodiment for transferring the colony basket stacks from the transport to the rendering station.

Figure 25:
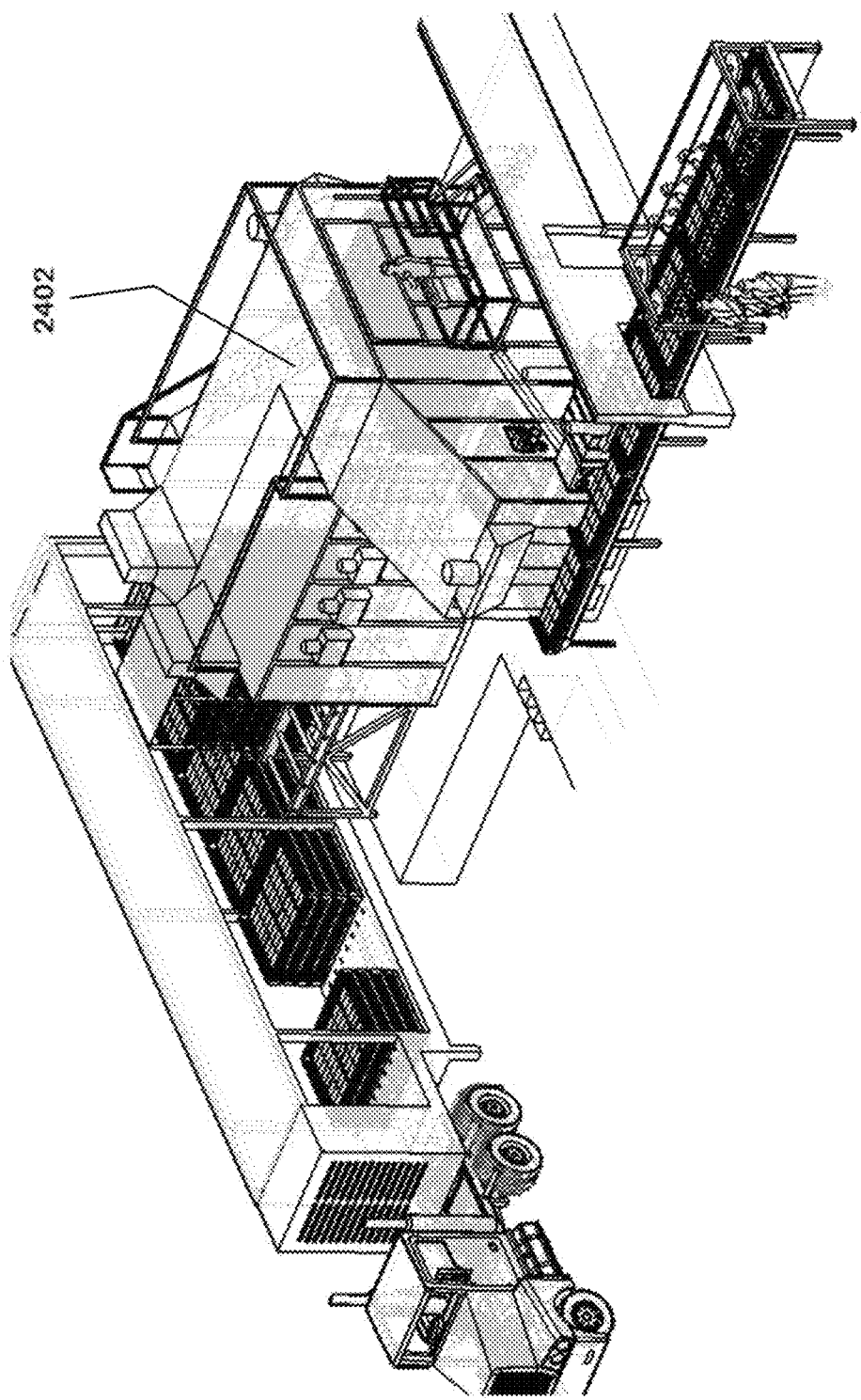
FIGS. 25 and 26 are an illustration of colony baskets traveling through the kill line and the cleaning station.
Figure 26:
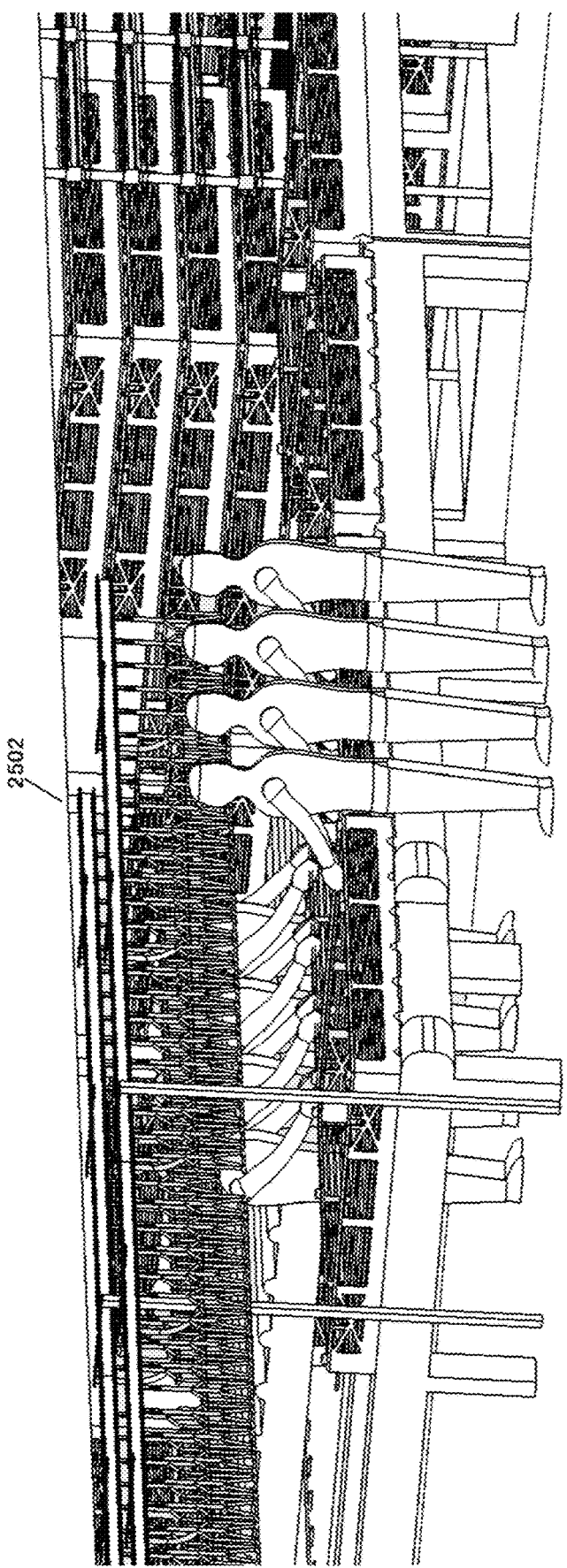

Referring to FIGS. 25-26, an illustration of colony baskets traveling through the kill line and the cleaning station is shown. FIG. 25 is a further illustration of the rendering or kill line whereby workers remove the birds from the colony baskets and hang the birds on the hanging conveyor shackles 2502.

The process can begin at the hatchery where a grouping of birds (for example DOC) are gathered and placed into a colony basket. A plurality of baskets can be stacked on over top of another for transport. A netting material can be shrouded over each colony basket to assist in containing the birds. The grouping of birds and their respective colony basket in which they are placed can remain in the same colony basket throughout the process until they are removed as broilers at the kill station. This reduces the handling of the birds to avoid injury and helps to prevent the spread of bacteria or disease between bird groupings. The grouping of DOC can be transported to a growing house in the same colony basket in which they were originally placed at the hatchery, where the poultry are grown for future processing. At the growing location there can be a series of growing colony racks for housing the colony baskets with the original grouping of birds placed therein at the hatchery. At the growing facility, the colony baskets can be integrated with water and feed channels and watering and feed troughs. The colony baskets can have a specific configuration to integrate with the watering and feeding systems as outlined herein in order to assist poultry going through the growth process and assist the operators at the growing facility for attending to the birds. When the poultry have completed the growth process, now in the broiler stage, they can be transported to a location for processing as a final food product. A transport can arrive at the growing location to receive the poultry that have completed the growth process. The transport system can be a truck and trailer combination. The trailer can be a standard flatbed trailer on which colony baskets containing the fully grown poultry can be loaded. The colony baskets containing the original grouping of birds, or some subset thereof, can be transferred from the colony racks of the colony system to the flatbed of the transport. A netting material can be shrouded over each basket before it is stacked in order to assist in retaining the bird. The colony baskets can be stacked one atop another. The transport can be loaded with the fully grown birds and transported along a travel route to an unloading station at a processing facility. The transfer system for transferring the colony baskets from the colony racks to the flatbed can be automated as described herein.

The unloading station can include an automated unloading system for automatically unloading a colony basket stack from the trailer for storage in an adjacent storage area of the processing facility. Tray stacks can be conveyed to a storage location having a climate controlled storage facility for housing the poultry in the stacked configuration prior to the rendering process. The storage area can be operated on a first in first out system such that a given colony basket stack does not dwell in the storage area for an extended period of time. The storage area can also have a system for controlling and tracking the weight of the tray stacks which could ultimately provide weight information regarding the fully grown poultry.

Within the storage facility there can be an automated unstacking system for unstacking the colony basket stacks for conveyance through the processing facility. There can be a stunning system utilized including a gaseous environment for stunning the poultry or it can include an electric shock stunning system or a combination of the two. If a gaseous environment stunning system is utilized, the gaseous environment can be a multi-stage stunning system where the first stage(s) can be a combined induction phase and the second stage(s) can be the combined stunning phase. This system can generally be referred to as a controlled atmosphere stunning system or CAS. Once the colony baskets containing the original grouping of birds/poultry have transitioned through the stunning system, the poultry can be unloaded from the trays at an unloading station. The unloading station can comprise an automated unloading system which is operable to tilt the colony baskets sufficiently to remove the stunned poultry from the colony baskets. This is the first point in the process that the birds are removed since their original placement into the colony basket at the hatchery as DOC. Once removed from the colony baskets, the stunned poultry can be conveyed to a shackling station where the poultry can be hung from a shackle conveyor for being conveyed to a plant evisceration facility.

As described the colony baskets can be stackable. Further the colony basket can have an interwoven wire mesh elevated floor above the colony basket bottom floor where the mesh openings are sufficiently large for debris to pass therethrough and also providing a means for the bird to grasp hold in order to stabilize itself and the mesh floor can be flexible in order to avoid injury to the birds. The frame of the colony baskets include various portions including perimeter top and bottom rim flanges and upright vented side walls. The upward facing surface portion of the upper perimeter top rim flange can be designed to be complimentary with respect to the downward facing portion of the bottom perimeter rim flange. This complimentary configuration can be designed such that the trays interlock when they are stacked thereby resisting longitudinal and latitudinal movement of the trays with respect to each other.

The stackable tray can be constructed having a top rim flange and a bottom rim flange, which defines the longitudinal and latitudinal dimensions of the tray. The top and bottom rim flanges can have L-shaped cross sections. The inner perimeter of the top rim flange can define an upper opening or upward facing opening through which birds can be easily inserted. The bottom rim flange defines the perimeter of the lower or downward facing opening closed off by the solid floor. The solid floor can have elevators for elevating the mesh floor proximately above the solid floor. The mesh flooring is designed with vented openings where the openings are sufficiently large to allow debris to pass there through. The flexible mesh floor design provides for a surface that can be grasped by the talons of a bird without injury. Upright side walls can be attached around the perimeter of the tray and attached to support members. The inner perimeters of the top rim flange and the bottom rim flange, which define the upper and lower openings respectively, can have substantially the same geometry.

The top rim flange can include stabilization standoffs which can extend vertically. The top rim flange can have on an upper surface a vertical standoff. The flange and the complementing recessed receptacle on the underside of the colony basket when engaged, one with respect to the other in a stackable fashion, they can resist longitudinal and latitudinal shifting of trays, one with respect to the other. Also, the stabilization standoffs can be placed along the latitudinal and longitudinal sides of the top rim flange. The spacing between the longitudinal, the latitudinal, and the corner upright support ribs define the vented openings of the tray. The spacing between the support members and the height of the support members can be optimized depending on the type of bird being contained within the stackable trays.

For stacked colony baskets the uppermost colony basket can have a top cover or a netting installed of the uppermost colony basket. The top cover can have a mesh screen for covering the opening of the uppermost tray. The perimeter of the mesh screen can be defined by the top cover flange. The top cover flange can have recessed receptacles for interfacing with the raised standoffs of the uppermost tray.

The colony basket stacks can be transitioned to the transport and loaded on the flatbed by way of a transfer rack or loading dock or other means for loading the colony basket stacks. Vertically protruding standoffs can be provided on the flatbed for and dimensioned to be received by the recessed receptacles of the lower most colony basket in a stack. The transport can have a shroud covering for better controlling the environmental exposure of the poultry. The shroud covering can be supported by transport side rails. One or both of the side panels of the shroud covering can be a retractable curtain for exposing the flatbed from either side. The shroud covering can also have a rear transport cover opening and or a side transport cover opening through which colony baskets can be loaded.

The stacked colony baskets can be loaded through the transport cover opening by sliding them along tray tracks which extend along the flatbed. The trailer can be a standard trailer; however, the trailer can have side railings for supporting shroud covering. The top surface of the flatbed can have raised standoffs that conform to the recessed receptacles on the underside of the tray to restrict lateral sliding or movement of the bottom most tray.

The technology described above includes an additional embodiment. In the additional embodiment, the colony baskets described herein above are replaced with modular baskets. The modular baskets may be utilized and integrated interchangeably with the invention described above.

Figure 27:
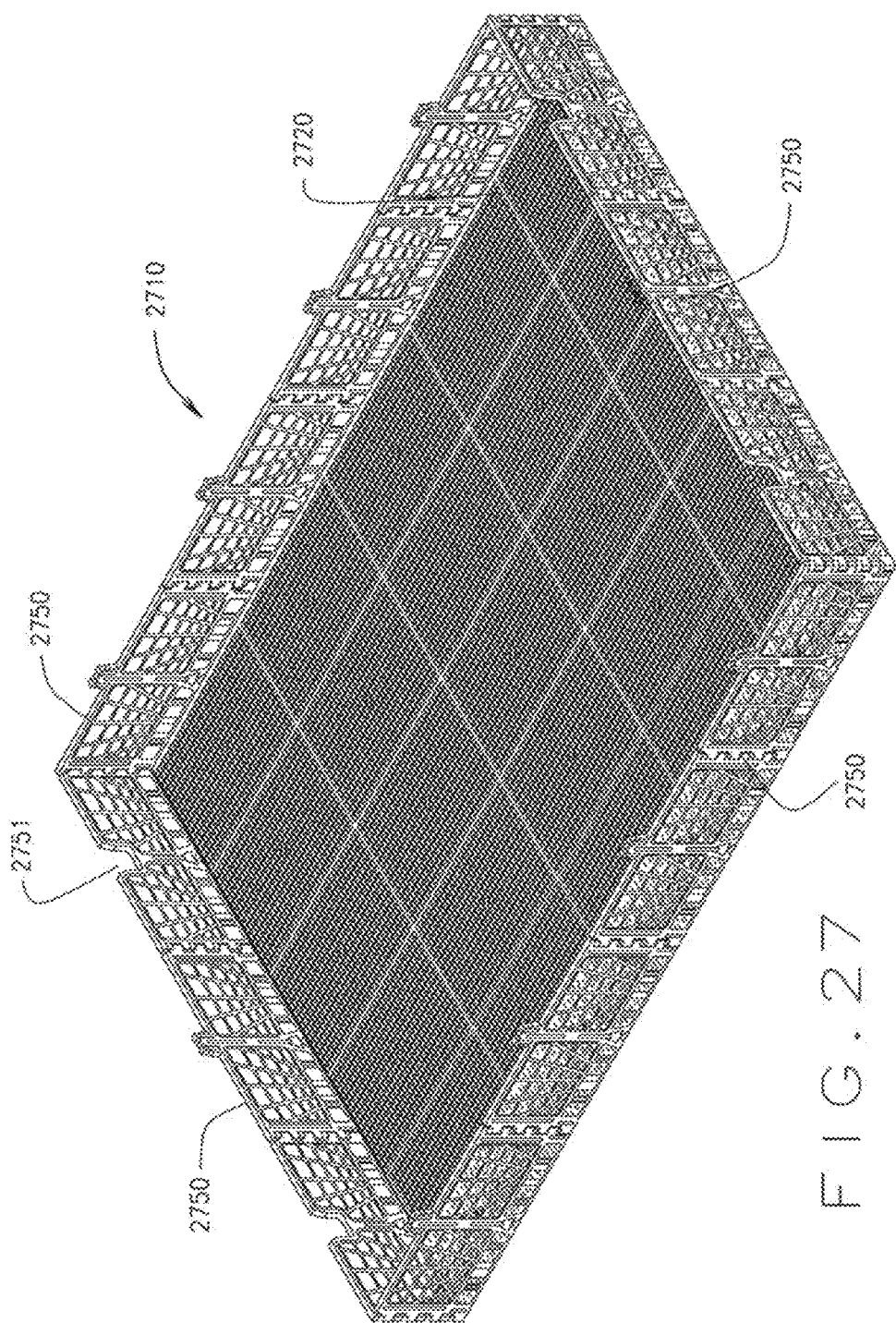
FIG. 27 is a perspective view of an assembled modular poultry raising basket according to the teachings of the present invention.
Figure 28:
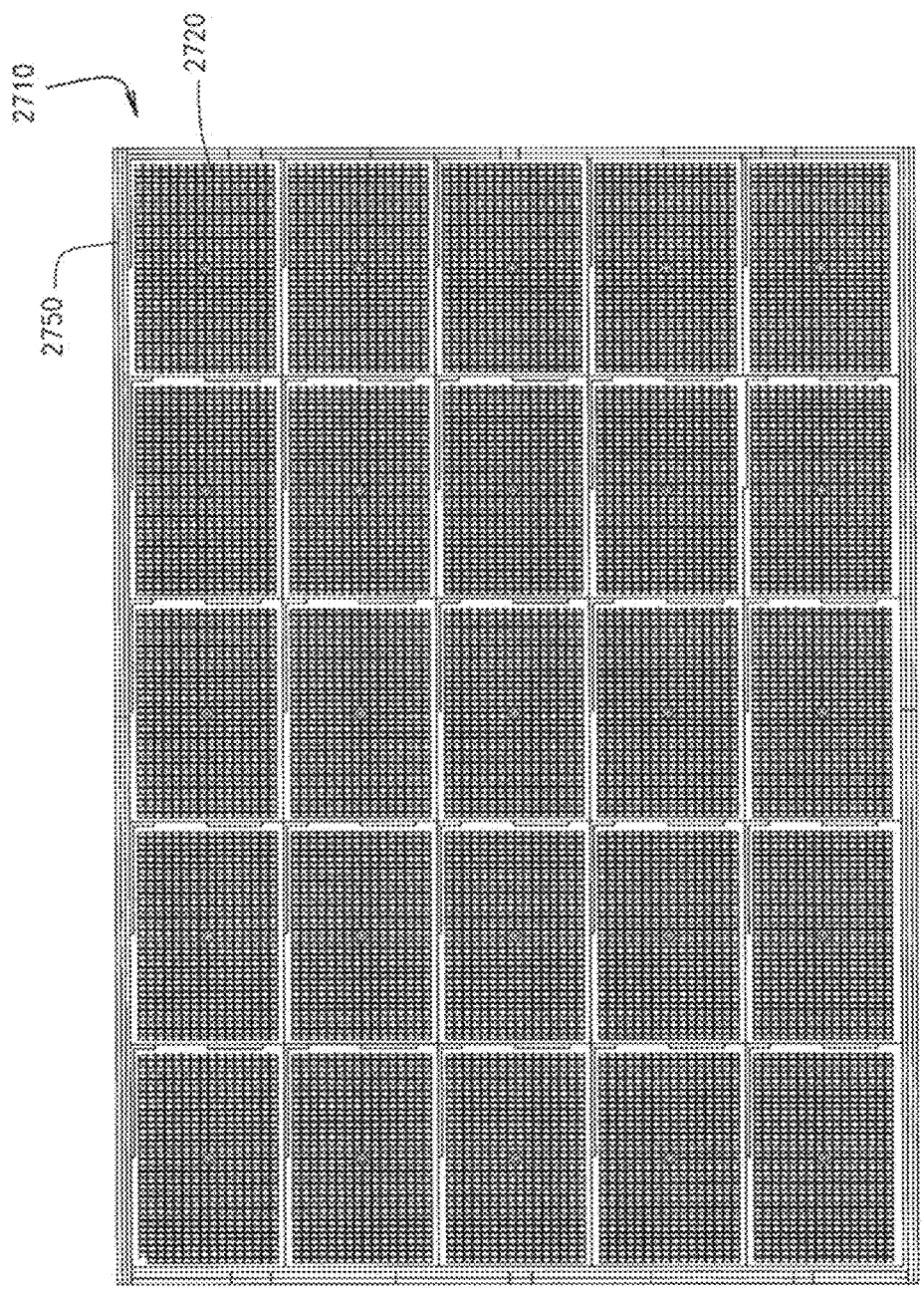
FIG. 28 is a top view of the poultry raising basket of FIG. 27.
Figure 29:
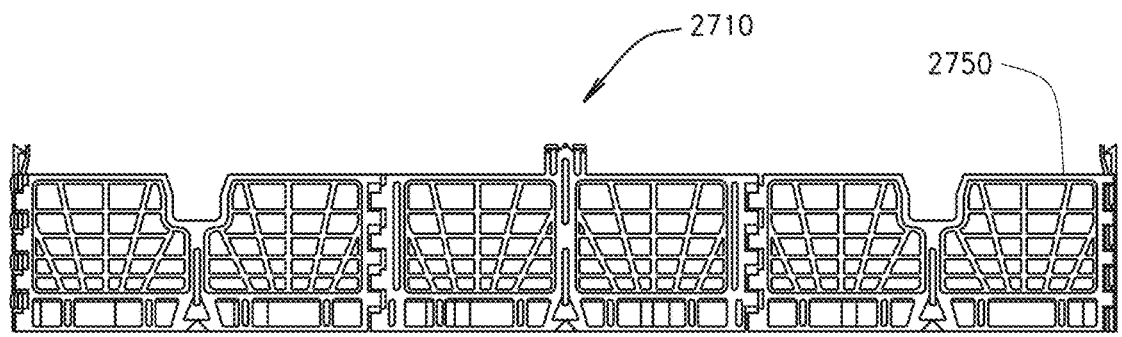
FIG. 29 is a side view of the poultry raising basket of FIG. 27.

FIGS. 27, 28 and 29 illustrate an implementation of a modular basket 2710 suitable for raising poultry or other animals and-or for transporting a product. The illustrative basket 2710 is a modular plastic basket formed of a plurality of interlocking plastic panels. The panels can be formed by injection molding, though other suitable materials and processes may be used to form the panels. In one embodiment, the panels are made of polypropylene and are connected using stainless steel beams. The modular basket 2710 is interchangeable with colony baskets 102 in the invention described herein above and can be fully integrated with other colony baskets in the overall system including integrating with the watering and feeding systems.

Each basket 2710 comprises a floor formed by an array of interconnected molded plastic floor panels 2720. The floor comprises a plurality of corner panels, edge panels and middle panels. Each floor panel can be formed as a flexible mesh panel for allowing animal waste and other debris to drop through while providing a comfortable surface for poultry. In the illustrative embodiment, each floor panels 2720 are identical and formed from the same mold, though the invention is not so limited.

Interconnected side panels 2750 are connected to the floor panels 2720 to form side walls for the basket 2710. As described below, the side panels receive beams that connect the floor panels to each other to connect the side panels to the floor. The side panels have pliable mesh of expanding size. As also described below, the basket 2710 comprises side panels having at least two different, but similar configurations.

The basket 2710 has an open top, though the invention is not so limited, and when the sides are assembled, recesses 2751 can be formed to receive watering and feeding systems.

The basket 2710 is stackable with one or more other baskets to form a vertical, space-saving stack of apartments. Multiple stacks may be arranged within a frame, or arranged side-by-side to form a colony.

The basket as illustrated comprises twenty-five floor panels 2720 and fourteen side panels 2750, though one skilled in the art will recognize that any suitable number and arrangement of panels may be used to form a basket of any suitable size, shape and configuration.

In one embodiment, each floor panel can be between about approximately fifteen and about approximately twenty inches, and one implementation can be between about eighteen and about nineteen inches, by between about approximately twelve and about approximately fifteen inches, and in one implementation can be between about approximately thirteen and about approximately fourteen inches. The side panels have a height between about approximately eight and about approximately twelve inches, and one implementation can be about ten inches and a length between about approximately twenty inches and about approximately twenty five inches.

The basket 2710 as illustrated and described may hold about ten lbs per square foot. The number of birds each basket holds depends on the intended slaughter weight of the bird. In one implementation, the basket 2710 may hold about 90 six pound birds, about 140 four pound birds or about 209 2.2 pound birds.

Figure 30A:
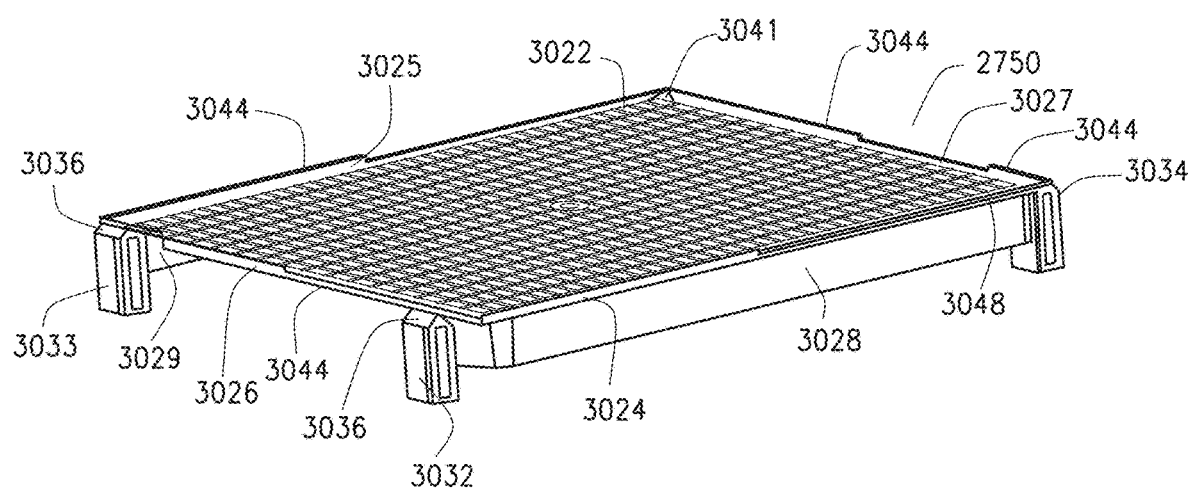
FIG. 30A is a perspective view of a floor panel for the basket of FIG. 27.
Figure 30B:
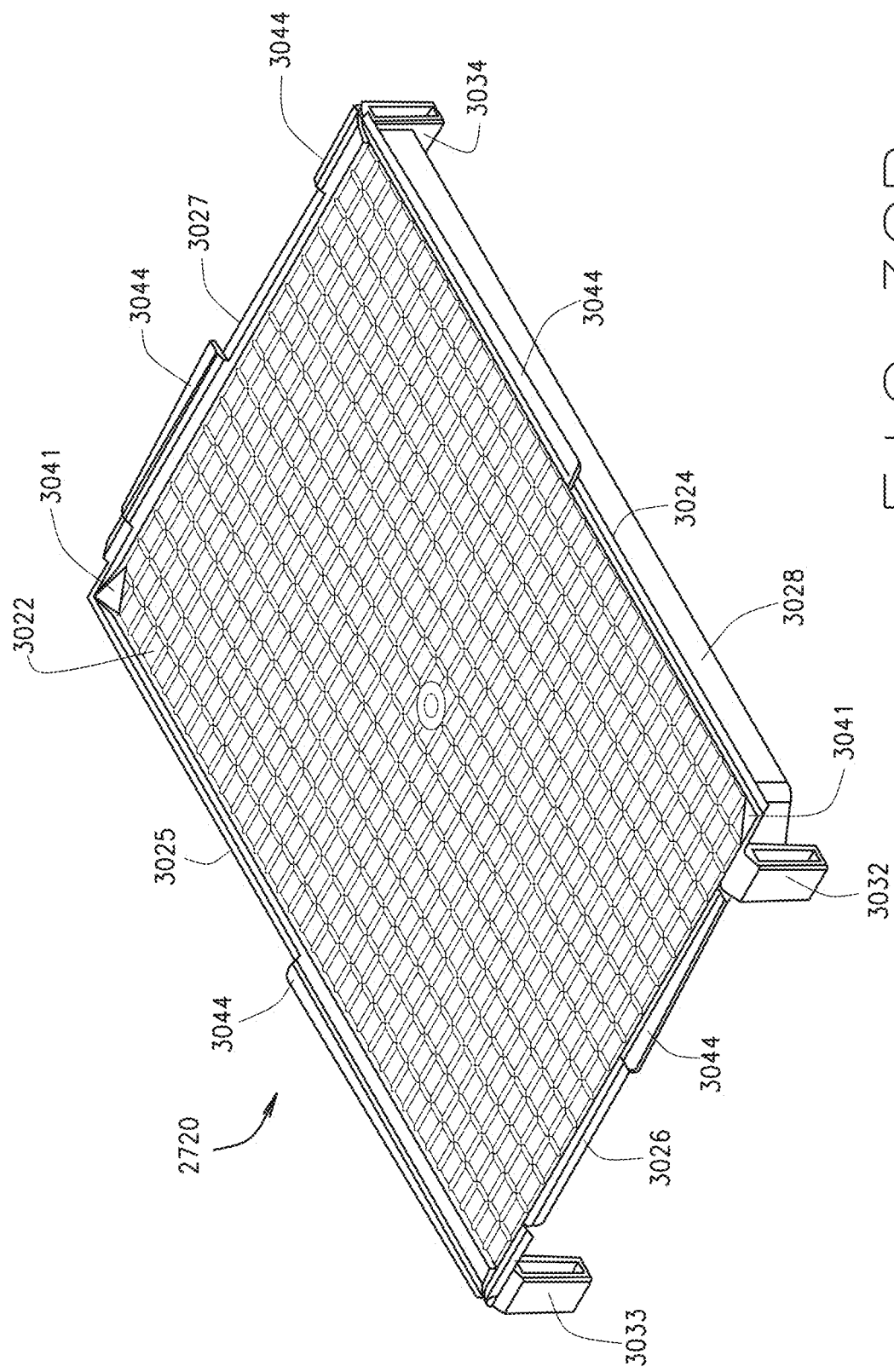
FIG. 30B is an alternative perspective view of the floor panel of FIG. 30A.
Figure 30D:
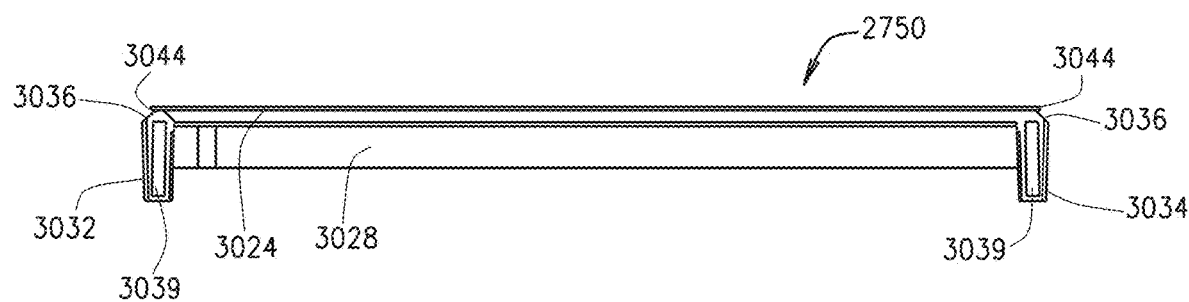
FIG. 30D is a front view of the floor panel of FIGS. 30A, 30B, and 30C.
Figure 31:
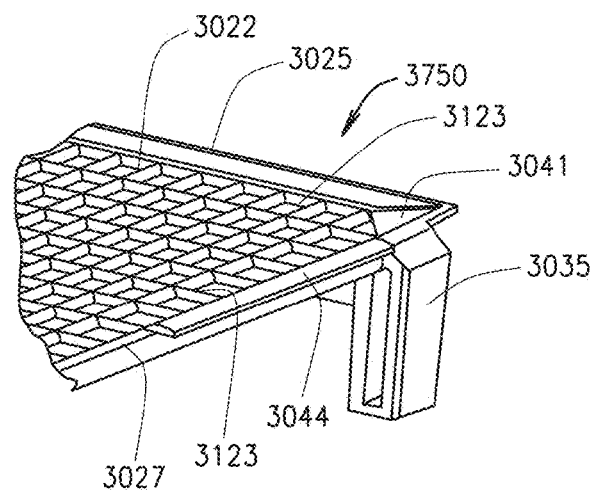
FIG. 31 is a detailed view of a corner of the floor panel of FIGS. 30A and 30B.

FIGS. 30A, 30B, 30C, and 30D illustrate a single floor panel 2720 suitable for forming a floor, or a portion of a floor, of a modular basket 2710. FIG. 31 is a detailed view of a corner of the floor panel 2720. Each floor panel comprises a flexible mesh floor 3022 extending between edges 3024, 3025, 3026 and 3027. A front support beam 3028 extends below edge 3024 and a rear support beam 3029 extends below edge 3025. The strands forming the mesh 3022 preferably have rounded tops to facilitate run off. In one implementation, the strands have a circular cross-section that is between about 0.100" and about 0.140' in diameter. The illustrative strands form square openings 3123 that are between about 0.375" and about 0.615" across, though the invention is not limited to the illustrative size and shape. The flexible mesh floor preferably has a certain flexibility to promote comfort and cleanliness. In one embodiment, the flexible mesh floor deflects about 0.5 inches at size pounds of weight in the center. The flexible floor may be more comfortable for the animals. In addition, the flexing may contribute to dried manure cracking off without requiring additional cleaning.

The edges slope downwards to create a bowl channeling debris through the mesh openings 3023. As shown in FIGS. 30A, 30B, and 31, the corners of each floor panel 2720 form downward sloping ramps 3041 for channeling debris through the mesh openings. The illustrative ramps 3041 are triangular in shape and widen from the top to the bottom.

The center of the floor panel 2720 may be solid for injection molding purposes.

Figure 32:
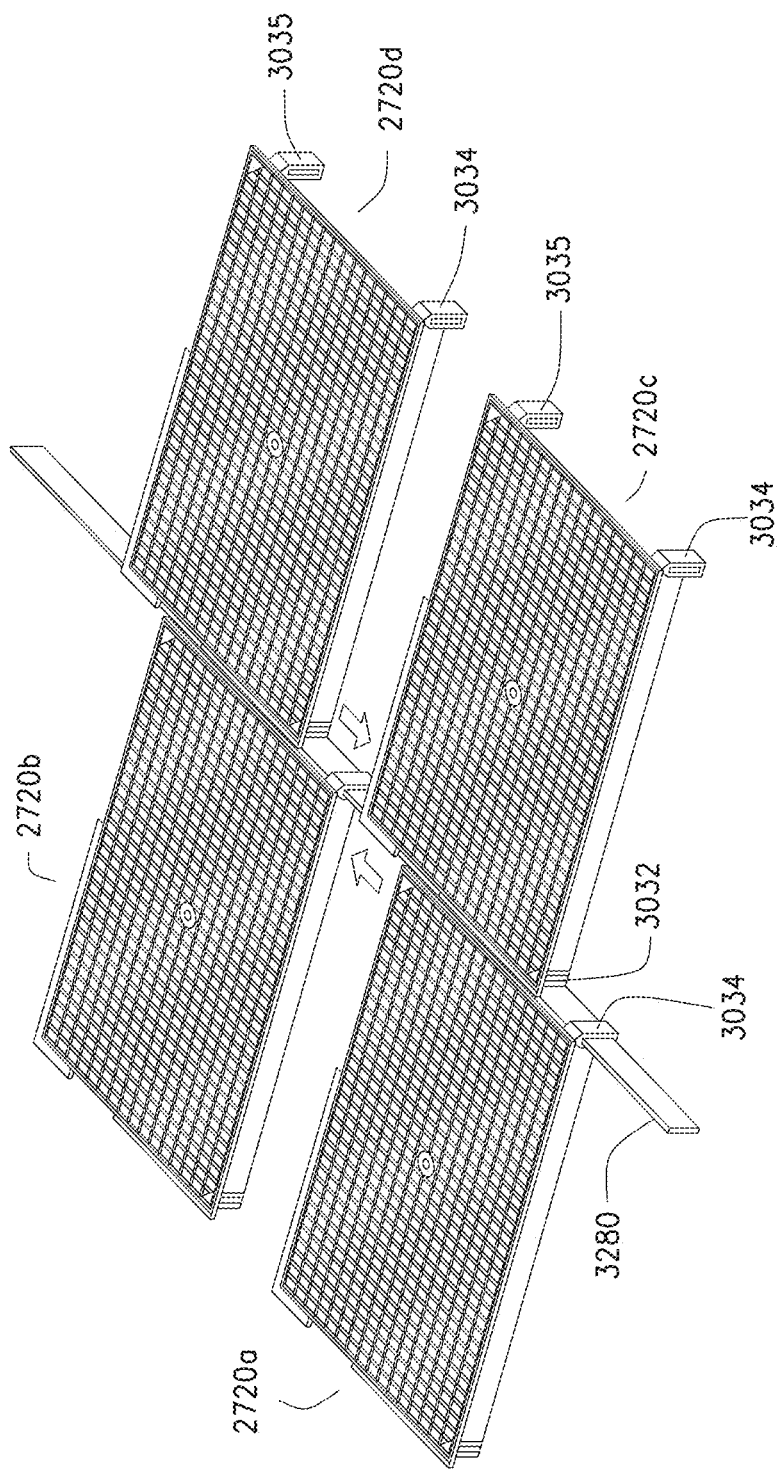
FIG. 32 is an exploded perspective view of assembling four floor panels using a beam for the basket of FIG. 27.
Figure 33:
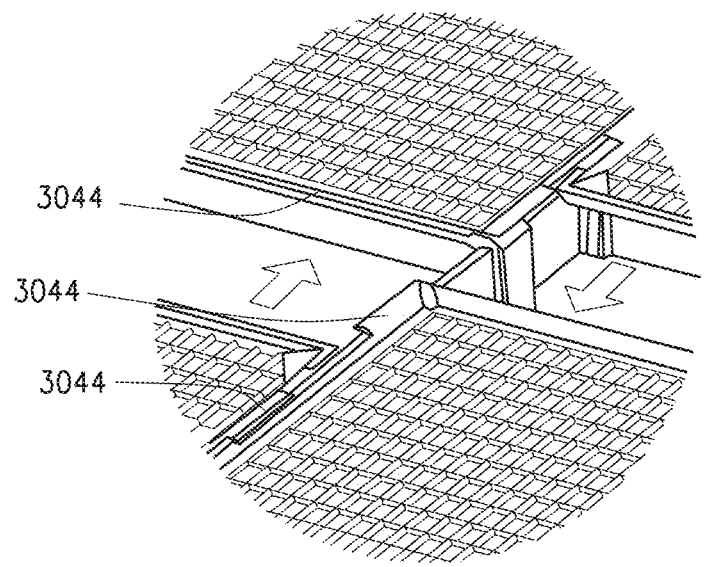
FIG. 33 is a detailed view of the intersection of the four floor panels of FIG. 32.

The floor panels 2720 include hinge elements 3032, 3033, 3034, 3035 extending below the mesh floor 3022 from each end of edges 3026 and 3027. A first pair of hinge elements 3032, 3033 extends down from edge 3026, and a second pair of hinge elements 3034, 3035 extends down from edge 3027. The second pair of hinge elements is offset from the first pair. As shown, hinge 3033 is positioned at a corner of the generally rectangular floor panel, whereas hinge 3032 is offset from the corner of the floor panel thereby allowing hinge 3034 of an interfacing abutting floor panel to be position adjacent hinge 3032 and aligned such that beam 3280 may be inserted through the hinge openings. Similarly, on the opposing side of the floor panel, hinge 3034 is positioned at the corner of the floor panel and hinge 3035 is positioned such that it is offset from the corner of the floor panel. Therefore, hinges 3033 and 3034 at diagonally opposing corners of the floor panel are positioned at the corner and hinges 3032 and 3035 are offset from the corner. FIGS. 32 and 33 illustrate the connection of a plurality of the floor panels 2720 using a beam 3280. As shown in FIGS. 32 and 33, the hinges 3032, 3033, 3034 and 3035 receive a beam 3280 for linking the floor panels together. The illustrative hinge elements include sloped upper surfaces 3036, flat sides and flat bottoms, though the invention is not so limited. Each hinge element includes a hinge opening 3039 for receiving the beam 3280. The illustrative hinge openings 3039 are bone shaped to ease beam insertion and facilitate manufacturability. The illustrative beam 3280 has a rectangular cross-section, but the invention is not so limited.

As shown in FIGS. 32 and 33, a beam 3280 may be used to join two columns of floor panels to form a floor of a basket, such as the basket 2710 of FIG. 27. The illustrative basket 2710 of FIG. 27 has five columns of floor panels 2720 in five rows, connected using six beams 3280, though the basket may comprise any suitable number of floor panels in any suitable arrangement. In addition, the floor may comprise multiple beams 3280 per column. FIGS. 32 and 33 show four floor panels 2720a, 2720b, 2720c, 2720d joined together by aligning the hinge elements 3034 and 3035 of the left floor panels 2720a, 2720b with the hinge elements 3032, 3033 of the right floor panels 2720c, 2720d and inserting a beam 3280 through the aligned hinge elements.

As clearly illustrated in FIG. 30C, the front hinge elements 3032 and 3034 of each floor panel are offset from each other, so that the hinge element 3032 of a right floor panel 2720c or 2720d is adjacent to and behind the hinge element 3034 of a left floor panel 2720a or 2720b when the floor panels are joined. The hinge element 3032 is spaced from the front edge 3024 of the floor panel by a distance that is equal to or greater than the width of the hinge element 3034 along the length of edge 3026, so that the corresponding hinge element 3034 fits between the front of the floor panel and the hinge element 3032. The rear hinge elements 3033, 3035 are also offset from each other to allow alignment of the hinges when the edges of the floor panels are brought together. The hinge elements of mating floor panels may abut each other or be spaced apart when joined. The floor panels may have more or fewer hinge elements that interlace.

Figure 34:
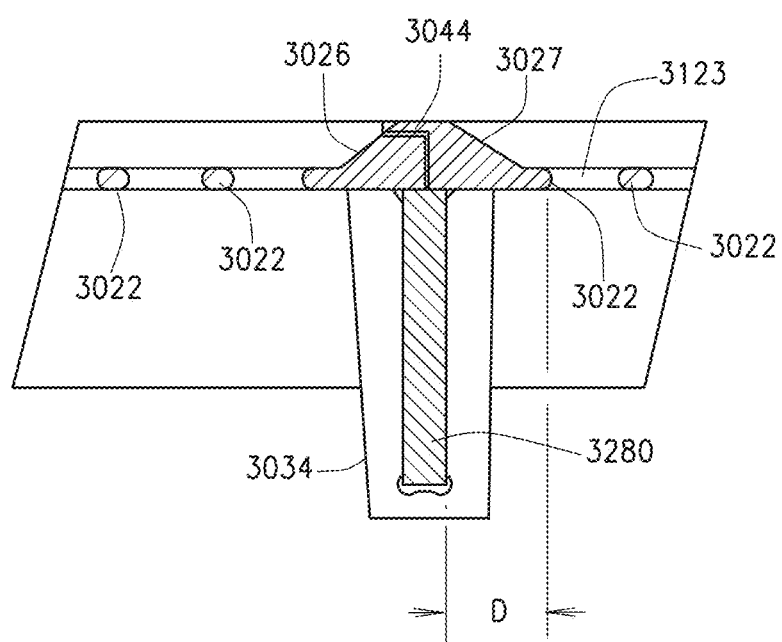
FIG. 34 is a cross-section view of an intersection between two adjacent floor panels using a beam for the basket of FIG. 27.

As shown in FIGS. 30A-34, each of the edges 3024, 3025, 3026 and 3027 includes lips 3044 that protrude from the edges. The lip 3044 in one implementation extend along a portion of an edge and is offset to one end of the edge. The lip 3044 is offset to one end of 3025, whereas the lip 3044 is offset to an opposing end of edge 3024. Edges 3024, 3025, 3026 and 3027 also slope downwards to promote debris channeling through the mesh 3022. Edges 3026 and 3027 are complementary, and edges 3024 and 3025 are complementary, so that the lips of one edge, such as edge 3027, fit in recesses between lips of a mating edge, such as edge 3026, as shown in FIG. 30. The shaped edges ensure that there is no seam over the beam 3280 to promote cleanliness. The overlapping edges ensure that the seams between the adjoined floor panels remain covered even as the weight of the animals increases and flexes the floor panels. In addition, the edges 3024, 3025, 3026 and 3027 extend inwards past the beam 3280 by a selected amount to promote the channeling of debris through the mesh 3022 and prevent soiling of the beam 3280. Thus, the outside edges of the floor 3022 are solid to protect the beam 3280. For example, in the embodiment shown in FIG. 34 the distance D between the front of the beam 8320 and the interface between the edge 3027 and mesh 3022 is at least 0.25" and preferably at least 0.5". Lip 3044 extends over edge 3026 as illustrated in FIG. 34 so that the seam is sealed.

Figure 35:
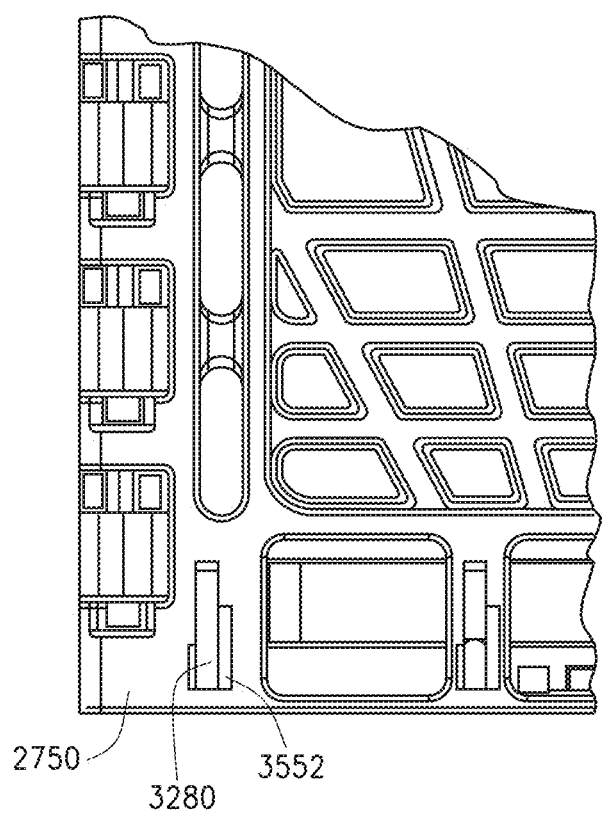
FIG. 35 is an illustration of a front lower corner of the basket of FIG. 27.

The side panels 2750 connect to the floor using the beams 3280. FIG. 35 is a detailed view of area 3 of FIG. 29, showing the connection between a beam 3280 and a side panel 2750 forming a side wall of the basket 2710. The beam 3280 that passes through and joins adjacent columns of floor panels passes into an opening 3552 in the side panel. The opening 3552 includes recesses to allow twisting of the beam end to lock the beam into place. In the illustrative embodiment, each beam 3280 linking two columns of floor panels passes into an opening in a side panel, but not all side panels receive beams. The edge beams 3280 extend through the hinges of the floor panels along each opposing end forming the short side of the basket floor and the edge beam also extends through the hooks 3769 of each side panel extending along the short side of the basket and these edge beams 3280 extend into the opening 3552 of a side panel 2750b extending along a long side of a basket and adjacent a corner.

The side panels 2750 are connected together to form the side walls of the basket 2710. In the illustrative embodiment, each side panel includes links along the first side and second side edges for connecting the side panel to an adjacent side panel. The links are configured such that the side panels may be connected at either 90° or 180°, as shown in FIG. 36 to form a corner of a side wall. Items 2750a and 2750b can be configured at a 90 degree angle to form a corner portion of the side wall.

The illustrative basket comprises four different configurations of side panels, each with similar features, as described below.

FIGS. 37A-37F are various views of a first side panel 2750a suitable for forming a side of a modular basket. The illustrative side panels 2750a are used adjacent to diagonally opposite corners on the short side of the basket 2710 of FIG. 27. Each side panel comprises a mesh wall formed between upper, lower and side edges. Each side panel 2750 includes female links 3762 on a first side and male links 3772 on an opposite side. The female links each comprise a protrusion 3763 extending from the side edge. The protrusion forming the female link includes two intersecting recesses 3764, 3765. The recesses 3764 and 3765 are perpendicular and have a square-shaped cross-section. The male links 3772 comprise protrusions 3773 aligned with spaces 3766 between the female protrusions. Rods 3775 extend between the protrusions. The illustrative rods 3775 have a square cross-section, with a thicker upper portion and a thinner lower portion. The female links 3762 receive the male links 3772 at either a 90° or 180° to connect two side panels together. As shown in FIG. 36, a u-shaped pin 3679 may be inserted into a space between the female protrusions 3763 and male protrusions 3773 to hold the links in place.

The side panels 2750a further include hooks 3769 extending from the bottom edge for receiving edge beams 3280 that connect floor panels together.

The side panels 2750a further include a cavity, illustrated as recess 3781, formed in the top edge for allowing the passage of feeding tubes or pipes. As illustrated, these side panels 2750a can be positioned to extend along the short side wall of the basket adjacent the corner of the basket.

An inside ledge 3791 extends between the links 3762, 3772 above the beam openings 3552. The ledge 3791 slopes downwards and overlaps the floor panels 2720 when the basket is assembled to promote cleanliness. Even when the floor panels bow under the weight of animals in the basket, the overlap between the inside ledges 3791 and floor panel edges prevent separation between the components.

Above the ledge 3791, the space between the edges of the panels forms an expanding mesh 3793. The openings 3795 in the mesh 3793 grow larger the higher they are to accommodate growing poultry. In one implementation, the openings are between about approximately one and about approximately three inches wide, where in one implementation the openings are about approximately 2.2 inches and between about one and about approximately two inches tall, preferably about approximately 1.5 inches tall.

The side panel 2750a further includes openings 3797 below the ledge 3791 to promote airflow. The side panels used in the opposite corners from the side panels 2750a are substantially similar, except for the length of the inside ledge 3791.

FIGS. 38A-38F illustrate an embodiment of a second side panel 2750b configured to mate with the first side panel 2750a. A second side panel 2750b is disposed between two first side panels 2750a on the short side of the basket 2710 of FIG. 27, and a series (four, in the illustrative embodiment) of second side panels are connected at 180° angles along the long side of the basket 2710. The second side panel 2750b includes the same female and male links, mesh, ledge, hooks and openings and further includes a stacking tip 3851 extending upwards from the top edge. The bottom edge includes a recess 3861 for receiving the stacking tip of a side panel in a basket below. For the long side of the basket, the second side panel 2750b has a minimal inside ledge 3791.

FIGS. 39-43 further illustrate the means by which side panels 2750b of baskets 2710 stacked on top of one another engage one another. As illustrated, stacking tip 3851 includes a pyramid-shaped protrusion 3852 having a flat front face 4153 and two straight protrusions 3854, 3855 opposing the pyramid-shaped protrusion for gripping the bottom edge of an overhead panel. When stacked, the stacking tip allows for a space 4070 to be formed between the overhead and below baskets.

Figure 44:
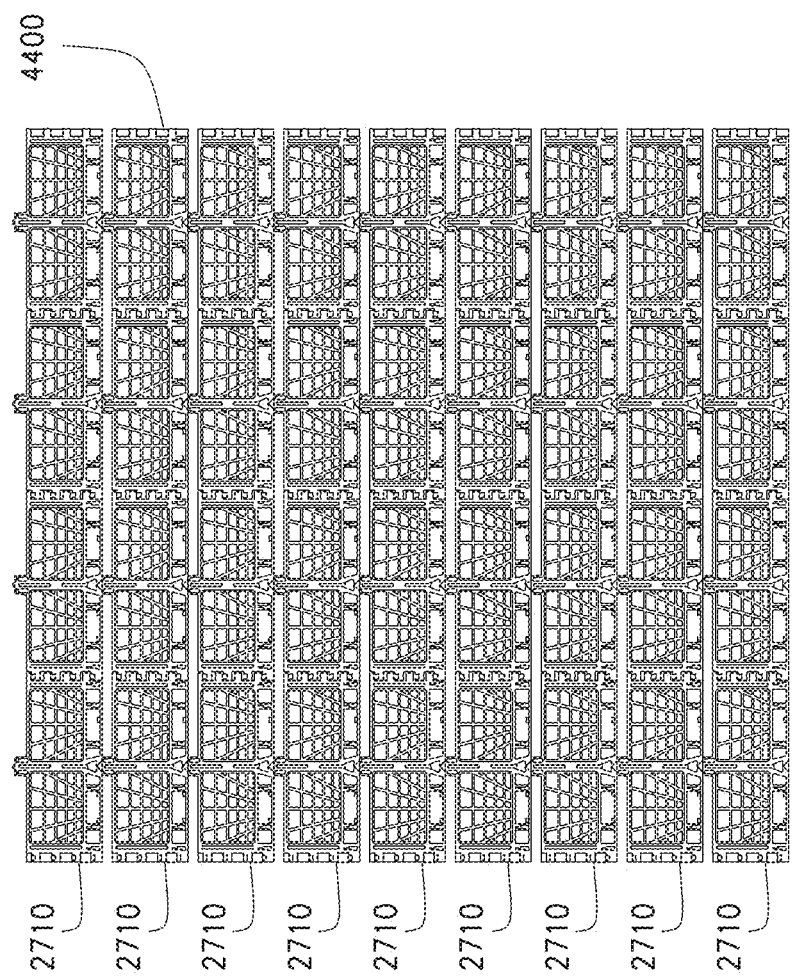
FIG. 44 illustrates a stack of modular baskets according to an embodiment of the invention.
Figure 39:
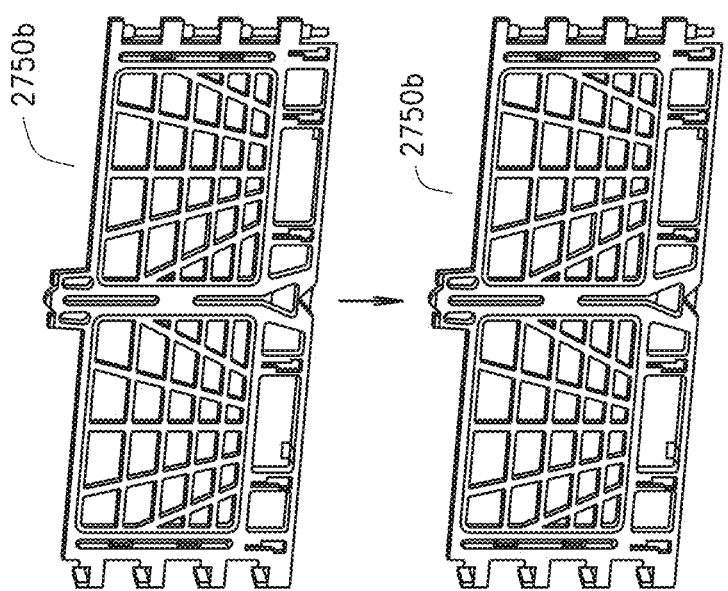
FIG. 39 illustrates the stacking of two side panels according to an illustrative embodiment of the invention.
Figure 43:
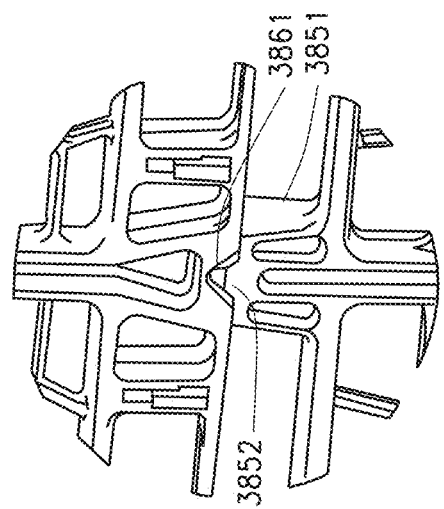
FIG. 43 is an enlarged illustration of region B of FIG. 42.
Figure 42:
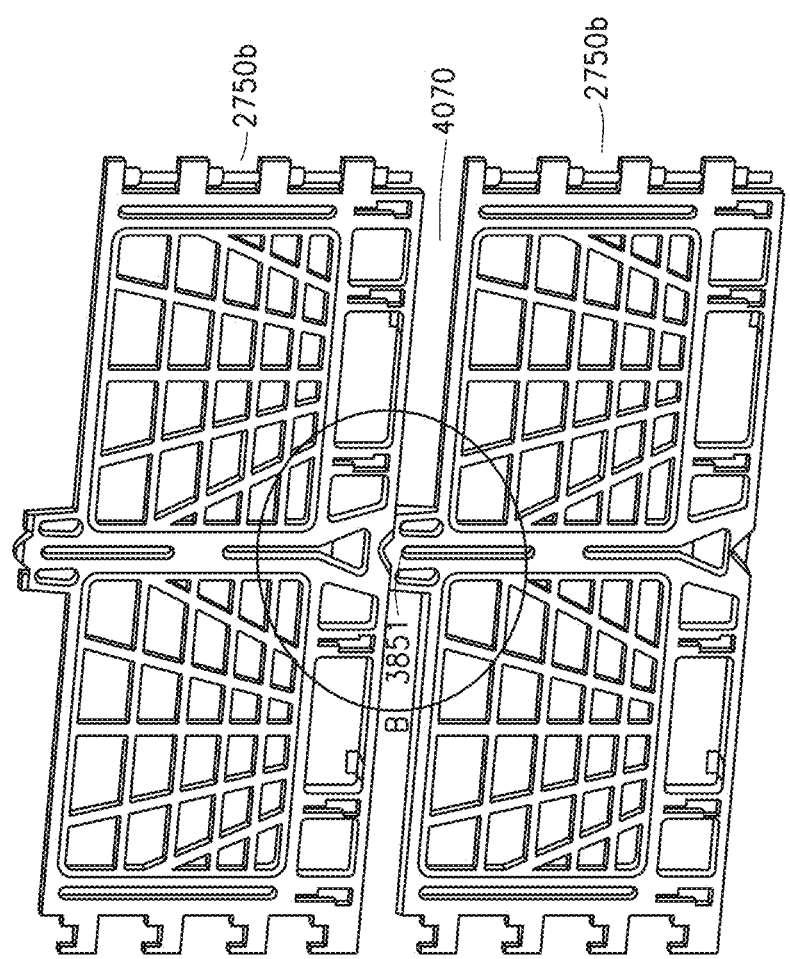
FIG. 42 is an illustration of the outside of the stacked side panels of FIG. 40.

FIG. 44 illustrates a stack 4400 of nine modular baskets 2710. Multiple baskets may be stacked together for transportation as described in the previous embodiment. The baskets are self-stacking and stabilized on top of each other.

Figure 45:
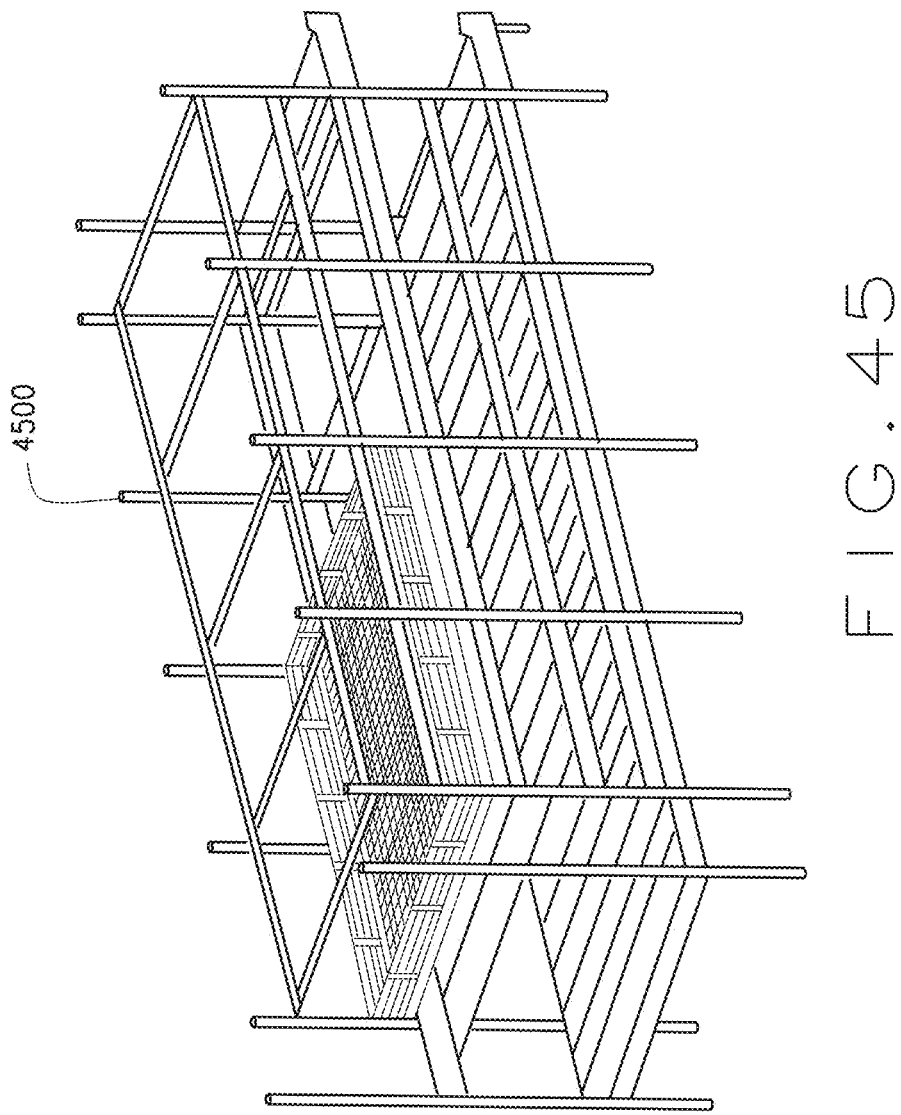
FIG. 45 illustrates a frame for a poultry colony employing modular baskets according to an embodiment of the invention.

FIG. 45 illustrates a frame 4500 for a chicken colony employing modular baskets. The frame includes multiple levels, each level housing a row or more of modular baskets. A conveyor belt may be used to convey the modular baskets 2710 on and off of the frame as described in the previous embodiment.

The illustrative modular plastic basket provides a comfortable, sanitary, accessible environment with optimal air flow and ventilation for raising chickens or other products. The modular plastic baskets are easily assembled and stackable to save space.

Poultry can be raised in the basket from the beginning to the end of life. The basket may be easily removed from a poultry house and trucked to a process facility, where it is unloaded, cleaned, then sent back to a hatchery or poultry house.

The various poultry handling examples shown above illustrate a novel system and method for handling poultry. A user of the present invention may choose any of the above chicken handling embodiments, or an equivalent thereof, depending upon the desired application. In this regard, it is recognized that various forms of the subject chicken handling could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A side panel used for forming a side wall of a structure, the side panel comprising:

a plurality of edges;

a mesh wall extending between the edges;

an opening extending through one of said edges below the mesh wall, the opening having a height and a width and positioned and configured to receive a beam through said opening;

one or more male links spaced apart along a first side edge and each of said male links protrude from said edge and where vertically oriented rods, having a lower rod section and an upper rod section that is thicker than the lower rod section, extend vertically from each of the one or more male links; and one or more female links spaced apart along a second side edge opposite the first side edge, where each of the one or more female links protrude from the second side and are vertically aligned with one of the vertically oriented rods and have recesses sized for receiving the vertically oriented rods.

2. The side panel of claim 1, where said rods have a square shaped cross section.

3. The side panel of claim 2, where the vertically oriented rods have a square shaped cross section and the female links include recesses complementary to the vertically oriented rods of the male links.

4. The side panel of claim 1, further comprising a hook horizontally extending from a bottom edge and a ledge horizontally extending from the mesh wall and positioned above the hook, where the distance between the hook and the ledge is equal to the height of the opening.

5. The side panel of claim 4, where the end of the hook is spaced away from the mesh wall an amount equal to the width of the opening.

6. The side panel of claim 1, where a top edge of the side panel and the mesh wall have a vertical recess configured for receiving a feeder.

7. The side panel of claim 1, further comprising a stacking tip, where the stacking tip extends from a top edge of the panel.

8. The side panel of claim 7, wherein the stacking tip comprises a pyramid-shaped protrusion and one or more straight protrusions.

9. The side panel of claim 8, where a bottom edge of the side panel includes a pyramid-shaped recess and one or more straight recesses sized and positioned to receive the pyramid-shaped protrusion and the one or more straight protrusion of the stacking tip.

10. The side panel of claim 1, where each of the recesses of the one or more female links includes a lower recess vertically aligned with the lower rod section and an upper recess vertically aligned with the upper rod section.

* * * * *